United States Patent
Bayesteh et al.

(10) Patent No.: US 9,214,995 B2
(45) Date of Patent: Dec. 15, 2015

(54) JOINT TRANSMISSION USING INTERFERENCE ALIGNMENT

(75) Inventors: Alireza Bayesteh, Kitchner (CA); Amin Mobasher, Waterloo (CA); Shiguang Guo, Kanata (CA)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

(21) Appl. No.: 14/236,229

(22) PCT Filed: Aug. 1, 2011
(Under 37 CFR 1.47)

(86) PCT No.: PCT/IB2011/001798
§ 371 (c)(1),
(2), (4) Date: Sep. 24, 2014

(87) PCT Pub. No.: WO2013/017902
PCT Pub. Date: Feb. 7, 2013

(65) Prior Publication Data
US 2015/0131751 A1 May 14, 2015

(51) Int. Cl.
*H04B 7/04* (2006.01)
*H04B 7/06* (2006.01)
(Continued)

(52) U.S. Cl.
CPC ............ *H04B 7/0482* (2013.01); *H04B 7/0413* (2013.01); *H04B 7/0456* (2013.01);
(Continued)

(58) Field of Classification Search
CPC .. H04B 7/0482; H04B 7/0413; H04B 7/0456; H04B 7/0486; H04B 7/0617; H04B 7/0619; H04B 7/0626; H04L 25/0204; H04L 25/0224; H04L 25/0391; H04L 25/03968; H04L 5/0023; H04W 36/20
See application file for complete search history.

(56) References Cited

U.S. PATENT DOCUMENTS

| 2010/0232528 A1 | 9/2010 | Li et al. |
| 2012/0087363 A1* | 4/2012 | Jongren et al. ............... 370/342 |

(Continued)

FOREIGN PATENT DOCUMENTS

| CN | 102025665 | 4/2011 |
| WO | WO 2010/130085 | 11/2010 |

(Continued)

OTHER PUBLICATIONS

"Amin Mobasher et al: ""Downlink multi-user 1-7,13 interference alignment in compound MIMO-Xchannels""", Information Theory (CWIT), 2011 12th Canadian Workshop on, IEEE, May 17, 2011, pp. 186-189, XP031944067, DOI: 10.1109/CWIT.2011.5872153 ISBN: 978-1-4577-0743-8".

(Continued)

*Primary Examiner* — Dac Ha
(74) *Attorney, Agent, or Firm* — Fish & Richardson P.C.

(57) ABSTRACT

Systems and methods can implemented to joint transmission for interference management in wireless communications. A first transmitter having M antennas can acquire a channel state information (CSI) matrix for each of a plurality of multiple-input-multiple output (MIMO) channels between a first transmitter and a plurality of receivers. The first transmitter can determine transmission ranks, wherein each of the transmission ranks corresponds to a number of one or more data streams to be transmitted from both the first transmitter and a second transmitter to a receiver of the plurality of receivers. A maximum transmission rank may be identified from the determined transmission ranks. Transmit data can be generated that include the one or more data streams to each of the corresponding plurality of receivers. A precoding matrix can be generated for the generated transmit data based, at least in part, on the acquired CSI matrix. The first transmitter can then encode the transmit data using the corresponding generated precoding matrix.

20 Claims, 8 Drawing Sheets

(51) Int. Cl.
  *H04L 25/02* (2006.01)
  *H04L 25/03* (2006.01)
  *H04W 36/20* (2009.01)
  *H04L 5/00* (2006.01)

(52) U.S. Cl.
  CPC ............ *H04B 7/0486* (2013.01); *H04B 7/0617* (2013.01); *H04B 7/0619* (2013.01); *H04B 7/0626* (2013.01); *H04L 25/0204* (2013.01); *H04L 25/0224* (2013.01); *H04L 25/0391* (2013.01); *H04L 25/03968* (2013.01); *H04W 36/20* (2013.01); *H04L 5/0023* (2013.01)

(56) References Cited

U.S. PATENT DOCUMENTS

| | | | |
|---|---|---|---|
| 2014/0204874 A1* | 7/2014 | Kim et al. | 370/329 |
| 2014/0219373 A1* | 8/2014 | Mobasher et al. | 375/267 |
| 2014/0269395 A1* | 9/2014 | Chen et al. | 370/252 |
| 2014/0348253 A1* | 11/2014 | Mobasher et al. | 375/267 |

FOREIGN PATENT DOCUMENTS

| | | |
|---|---|---|
| WO | WO 2011/014014 | 2/2011 |
| WO | WO 2011/072621 | 6/2011 |

OTHER PUBLICATIONS

"Tokyo Institute of Technology: ""Hybrid 1-3,6.7. feedback and preceding for MU-MIMO & 13 JT-CoMP""",3GPP Draft; RI-101290—Hybrid Feedback and Precoding for MU-MIMO & JT-COMP—Tokyo Tech, 3rd Generation Partnership Project (3GPP), Mobile Competence Centre . 650, Route Des Lucioles ; F-06921 • Sophia-Antipolis Cedex ; France, vol. RAN WGI, no. San Francisco, USA; 20100222, Feb. 19, 2010, XP050419030, [retrieved on Feb. 19, 2010]".

European Search Report in European Application No. 11870505.2, dated Apr. 7, 2015, 6 pages.

International Search Report and Written Opinion of the International Searching Authority issued in International Application No. PCT/IB2011/001798 on Apr. 25, 2012; 11 pages.

Sung, H. et al.; "Linear Precoder Designs for K-user Interference Channels"; IEEE Transaction on Wireless Communications; vol. 9, Issue 1; Jan. 2010; pp. 291-301.

Zhang, J. et al.; "Networked MIMO with Clustered Linear Precoding"; IEEE Transactions on Wireless Communications; vol. 8, Issue 4; Apr. 2009; pp. 1910-1921.

International Preliminary Report on Patentability issued in International Application No. PCT/IB2011/001798 on Feb. 13, 2014.

Extended European Search Report in European Application No. 11870505.2, dated Jul. 27, 2015, 11 pages.

* cited by examiner

JOINT TRANSMISSION USING INTERFERENCE ALIGNMENT

CLAIM OF PRIORITY

This application is a U.S. National Stage of PCT/IB2011/001798 filed on Aug. 1, 2011, the entire content of which is hereby incorporated by reference.

TECHNICAL FIELD

The present disclosure relates to wireless communications and, more particularly, to joint transmission using interference alignment.

BACKGROUND

In wireless communications, since the wireless communication devices communicate via a common air interface, their signals are not isolated from each other. This fact may results in two effects, i.e., i) broadcast: signals from any one transmitter may be received by multiple receivers, and ii) superposition: a wireless receiver receives signals from multiple transmitters, with their signals superimposed on top of each other. Thus, interference may result from the two effects. In some systems, mobility management may enable cellular networks to locate moving user equipments (UEs) for call delivery and to maintain connections when the UEs move into a new cell/service area, this process is called handover, or handoff. While performing handover, the UEs may connect to more than one access device (e.g., base stations) simultaneously and use a certain form of signaling diversity to combine downlink signals from the more than one access device. In some instances, this technique is called soft handover. Soft handover may be used to transmit the same data from the more than one base station to one UE simultaneously to improve reliability of transmissions. However, downlink signals intended for different UEs may cause interferences to each other at the UE. Similarly, for some other joint transmission scenario (e.g., Coordinated Multi-Point (CoMP)), multiple transmitters may jointly transmit signals that are intended to different receivers. For a particular receiver, transmit signals intended to other receivers may be perceived as interference.

In some systems, schemes for interference management may include decoding the transmitted signal by treating interferences as noise, and orthogonalizing channel resources for multiple access of wireless communication devices by assigning different frequency channels, time slots, spatial paths and/or codes to different resources (e.g., frequency division multiple access (FDMA)/time division multiple access (TDMA)/code division multiple access (CDMA)/orthogonal frequency division multiple access (OFDMA)). In some systems, each of multiple transmitters may communicate with one corresponding receiver. If each of the multiple transmitters knows perfect global channel knowledge about all channels in the system, an interference alignment (IA) technique may be used for interference management. Using IA, multiple senders may encode signals by expanding the dimension of the signals and align interferences to at least a portion of the expanded dimension in order to manage interference caused at the corresponding receiver.

DESCRIPTION OF THE DRAWINGS

Like reference symbols in the various drawings may indicate like elements.

DETAILED DESCRIPTION

Figure 1:
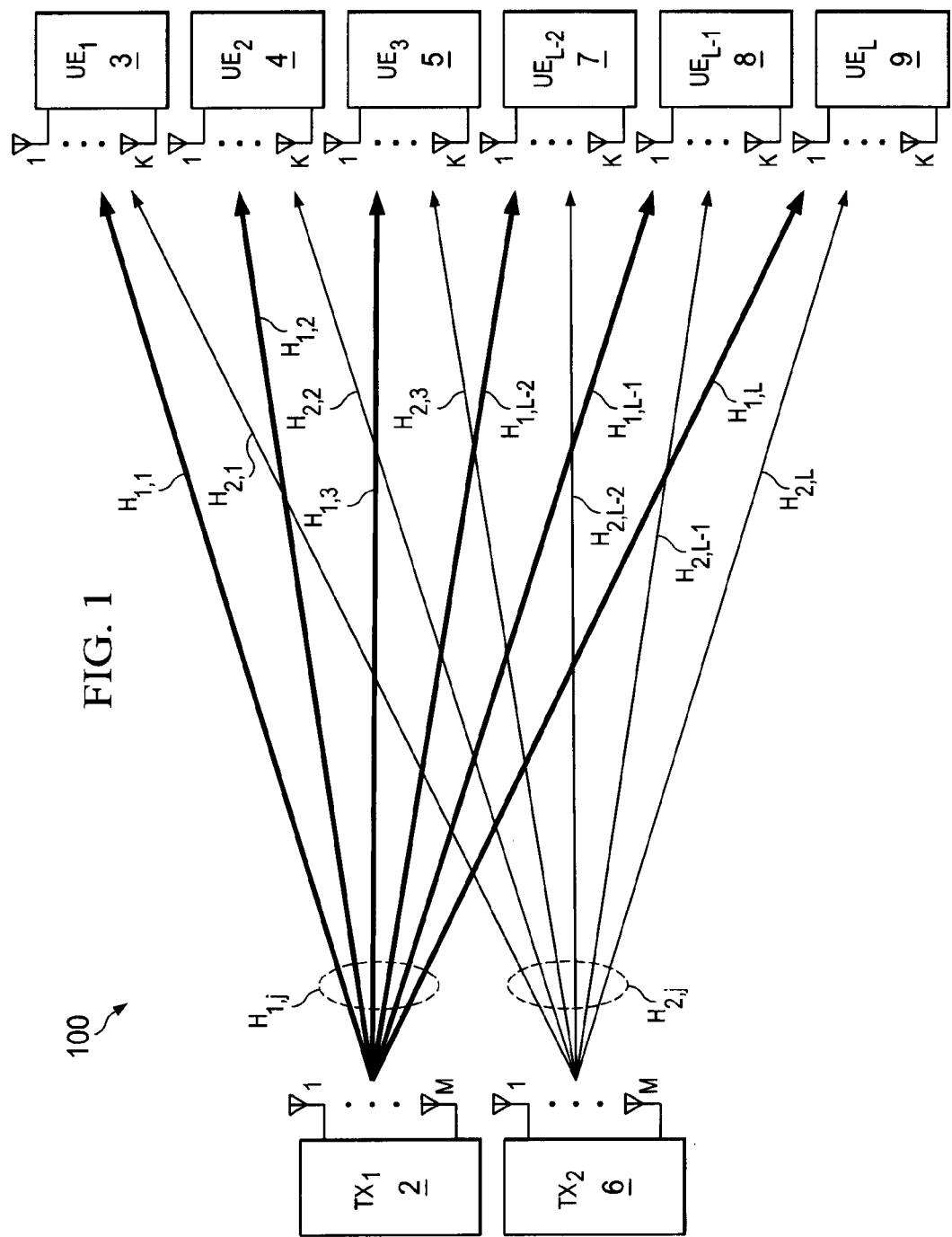
FIG. 1 is a schematic diagram showing an example system suitable for some implementations of the present disclosure.

The present disclosure provides for systems, methods, and apparatuses relating to wireless communications and, more particularly, to joint transmission using interference alignment. Joint transmission may include multiple transmitters jointly transmitting data to different receivers, such as joint user equipment (UE) soft handover in cellular networks. Using joint UE soft handover for example, in some implementations, more than one UE, each equipped with K antennas are handed over between a first base station and a second base station, each equipped with M antennas. The first base station may acquire a channel state information (CSI) matrix for each of more than one multiple-input-multiple-output (MIMO) channels between the more than one UE and the first base station. In some instances, the CSI matrix may be acquired by receiving feedback information associated with the CSI from the more than one UE. The first base station may determine transmission ranks for the more than one UE, each of the transmission ranks corresponds to the number of data streams to be transmitted from the first base station to a particular one of the more than one UE. In some instances, the transmission ranks are determined based on rank indicator reported by the more than one UE through uplink channels. The first base station may also identify a maximum transmission rank $d_{max}$ among the determined transmission ranks. In some instances, the transmission ranks should be determined, such that the sum of the transmission ranks and $d_{max}$ is less than or equal to M. For soft handover, the first base station and the second base station may transmit the same data to the more than one UE during the handover phase. In some instances, the first base station and the second base station may use joint encoding techniques including Alamouti code and space time/frequency block code (STBC/SFBC) to obtain diversity gain. The transmit data may be generated to include one or more of data streams to each of the more than one UE. The number of the one or more data streams for each of the more than one UE may be equal to the corresponding determined transmission rank of the particular UE. A precoding matrix for each of the more than one UE may be generated for interference alignment. In some instances, the precoding matrix may be generated based on the acquired CSI matrices, and one or more predetermined vectors. The one or more predetermined vectors may form a number of orthogonal basis vectors for an M-dimensional transmission space. In some instances, applying the precoding matrix can increase the transmission rank for each of the plurality of signals to M, and create a $d_{max}$ dimensional null space for interference alignment. The first base station may then encode the generated transmit data using the precoding matrix and transmit the encoded signal to the more than one UE. The second base station may encode the generated transmit data based on substantial similar process as the first base station. In some implementations, each of the more than one UE may decode the encoded signal transmitted using a decoding matrix generated based on at least the one or more predetermined vectors and a pseudo inverse of the corresponding CSI matrix, in order to cancel interferences aligned to the null space, and obtain an interference free signal from each of the first base station and the second base station. After interference cancellation, each UE may use a diversity combining technique to increase the output signal-to-noise ratio (SNR), which is a ratio of signal power to the effective noise power corrupting the signal. Example diversity combining techniques may include maximal ratio combining and optimal combining. In some instances, optimal combining may include applying one or more weighting coefficients to the decoded signal from at least one of the first base station, or the second base station, the one or more weighting coefficients may be determined by using exhaustive search for one or more values that maximizes an output SNR.

In some aspects, the interference alignment scheme disclosed may use a low-complexity scheme without perfect global channel knowledge (i.e., the CSI between all transmitter and receiver pairs operating in the wireless system) and the attendant overhead to manage interference between two interfering transmitters, while only local channel knowledge may be used at the transmitters and/or the receivers to encode and/or decode signals. For example, each transmitter may acquire just the estimated CSI of the channels between each receiver and this particular transmitter, each receiver may acquire just the estimated CSI of the channels between each transmitter and this particular receiver.

It is to be understood that although joint UE soft handover is used as an example for the illustration of interference alignment, the use of the disclosed interference alignment scheme is not limited to a cellular network soft handover scenario, any MIMO transmissions between multiple receivers and two distributed transmitters that can encode and transmit the same data may use the interference alignment scheme described in this disclosure.

In some instances, wireless networks suitable for some of the various implementations of this disclosure may be a wireless network that includes two transmitters $TX_1$, $TX_2$ (e.g., Macro eNB, relay node, Micro eNB, etc.), each equipped with M antennas to serve L receivers (e.g., UE) at a given time, where each transmitter may know the effective channels from itself to each of the receivers. Each receiver is equipped with K antennas and is positioned to potentially receive the same data symbols encoded respectively at the two transmitters using the same time slot and frequency band. Thus, the $j^{th}$ receiver (j=1, ..., L) receives a rank $d_j$ transmission from the first transmitter $TX_1$ and the second transmitter $TX_2$. Each UE receives a transmission from both transmitters and uses an indexed list of linearly independent, predetermined vectors $V_{ref}=\{v_{ref}^1, \ldots, v_{ref}^M\}$ and channel knowledge $H_1$, $H_2$ from each transmitter to i) compute combining vectors corresponding to each transmitter $TX_i$ to convert the cross channel interference from the other transmitter to a predetermined sub-space consisting of one or more vector(s) from the vector set $V_{ref}$ to leave a bigger sub-space for interference-free signal transmission for its affiliated transmitter, and ii) compute, for each transmitter, equivalent channel matrix information $H_{i,j}^{eq}$ which is then fed back or otherwise acquired by transmitter $TX_i$. With this information, each transmitter can construct a transmit signal by applying a selected precoding matrix $V_i$ to the data symbols a to be transmitted where $V_i$ includes a number of columns in the inverse of the matrix $P_i$. Separate example scenarios are described to cover the case where the number of receiver antennas is greater than or equal to the number of transmitter antennas (e.g. K≥M) and where the number of transmitter antennas is greater than the number of receiver antennas (e.g. K<M).

Various illustrative implementations of the present disclosure will now be described in detail with reference to the accompanying figures. While various details are set forth in the following description, it will be appreciated that the present disclosure may be practiced without these specific details, and that numerous implementation-specific decisions may be made to the disclosure described herein to achieve the device designer's specific goals, such as compliance with communication system limits or design-related constraints, which will vary from one implementation to another. While such a development effort might be complex and time-consuming, it would nevertheless be a routine undertaking for those of ordinary skill in the art having the benefit of this disclosure. For example, selected aspects are shown in block diagram form, rather than in detail, in order to avoid limiting or obscuring the present disclosure. Some portions of the detailed descriptions provided herein are presented in terms of algorithms and instructions that operate on data that is stored in a computer memory. Such descriptions and representations are used by those skilled in the art to describe and convey the substance of their work to others skilled in the art. In general, an algorithm refers to a self-consistent sequence of steps leading to a desired result, where a "step" refers to a manipulation of physical quantities which may, though need not necessarily, take the form of electrical or magnetic signals capable of being stored, transferred, combined, compared, and otherwise manipulated. It is common usage to refer to these signals as bits, values, elements, symbols, characters, terms, numbers, or the like. These and similar terms may be associated with the appropriate physical quantities and are merely convenient labels applied to these quantities. Unless specifically stated otherwise as apparent from the following discussion, it is appreciated that, throughout the description, discussions using terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

As used herein, the terms mobile wireless communication device and UE (UE) are used interchangeably to refer to wireless devices such as pagers, cellular phones, cellular smart-phones, wireless organizers, personal digital assistants, wireless Internet appliances, data communication devices, data messaging devices, computers, handheld or laptop computers, handheld wireless communication devices, wirelessly enabled notebook computers, mobile telephones, set-top boxes, network nodes, and similar devices that have wireless telecommunications capabilities. In wireless telecommunications systems, transmission equipment in a base station or access point transmits signals throughout a geographical region known as a cell. As technology has evolved, more advanced equipment has been introduced that can provide services that were not possible previously, including but not limited to enhanced node B (eNB) devices rather than a base station or other systems and devices that are more highly evolved than the equivalent equipment in a traditional wireless telecommunications system. Examples of such advanced or next generation equipment include, but are not limited to, LTE equipment or LTE-Advanced (LTE-A) equipment, and a packet-based network that uses such equipment can be referred to as an evolved packet system (EPS). As used herein, the terms access device or access point refer interchangeably to any component that can provide a UE with access to other components in a telecommunications system, including but not limited to a traditional base station or an LTE or LTE-A access device. An access point provides radio access to one or more UEs using a packet scheduler to dynamically schedule downlink traffic data packet transmissions and allocate uplink traffic data packet transmission resources among all the UEs communicating to the access device. The functions of the scheduler include, among others, dividing the available air interface capacity between UEs, deciding the transport channel to be used for each UE's packet data transmissions, and monitoring packet allocation and system load. The scheduler dynamically allocates resources for Physical Downlink Shared CHannel (PDSCH) and Physical Uplink Shared CHannel (PUSCH) data transmissions, and sends scheduling information to the UEs through a control channel.

FIG. 1 is a schematic diagram showing an example system 100 suitable for some implementations of the present disclosure, a downlink compound multi-user interference alignment scheme may be implemented for signal transmissions from transmitters 2, 6 to receivers 3-5, 7-9 in accordance with some implementations. In the depicted example, each of the transmitters $TX_1$ 2 and $TX_2$ (e.g., eNBs) is equipped with M antennas and configured to transmit signals to receivers (e.g., UEs) which are each equipped with K antennas and configured to receive downlink signals. As will be appreciated, multiple dimensions can be generated by using subcarriers (in an OFDM system), antennas, or both, such that M=(the number of subcarriers or the number of time slots)×(the number of actual transmit antennas) and K=(the number of subcarriers or the number of time slots)×(the number of actual receive antennas).

One or more data streams for each UE may be encoded and transmitted from both $TX_1$ 2 and $TX_2$ 6. As shown, the transmitters $TX_1$ 2 and $TX_2$ 6 perform joint handover for L UEs. Each transmitter $TX_i$ 2, 6 denotes a data transmission device such as a fixed base station, a mobile base station, Macro eNB, Relay Node, Micro eNB, a miniature or femto base station, a relay station, and the like. Each of the receiver nodes 3-5, 7-9 denotes a data reception device such as a relay station, a fixed terminal, a mobile terminal, UE and the like. In addition, the $j^{th}$ receiver node or UE (j=1, . . . , L) is configured to receive a rank $d_j$ transmission, where $d_j$ is a natural number. Since $TX_1$ 2 and $TX_2$ 6 transmit the same data streams to each of the UEs, during soft handover, their respective transmission ranks for each UE are the same. The total number of transmission ranks for each of $TX_1$ 2 and $TX_2$ 6 is denoted by $D=\Sigma_{j=1}^{L} d_j$.

Depending on the transmission scheme used by the transmitters $TX_1$ 2 and $TX_2$ 6 and the location of the UEs, the receiver nodes 3-5, 7-9 receive two data streams from each transmitter $TX_1$ 2 and $TX_2$ 6. For example, at the first receiver node UE, 3, the signal from the first transmitter $TX_1$ 2 arrives over direct channel $H_{1,1}$, and the signal from the second transmitter $TX_2$ 6 arrives over channel $H_{2,1}$. Similarly, the other receiver nodes 4-5, 7-9 receive two signals over wireless channels in the network 100. To capture both signals from transmitters $TX_1$ 2 and $TX_2$ 6 intended to each receiver and overcome the interference caused by transmission to other receivers, an interference alignment scheme is proposed where each transmitter obtains its own channel state information (CSI) from each UE (j=1, . . . , L) and each UE only needs to know the channel between itself and each transmitter. In selected implementations, the proposed interference alignment scheme uses a plurality of linearly independent vectors $V_{ref}=\{v_{ref}^1, \ldots, v_{ref}^M\}$ to construct a pair of combining vectors—one for each transmitter $TX_1$ 2 and $TX_2$ 6—at each of the UEs 3-5, 7-9, depending on the rank of the UE. Using the combining vectors, each UE (j=1, . . . , L) projects all cross channels from the other transmitter to a predetermined subspace span $\{(v_{ref}^l)^H\}$ for l=1, . . . , $d_j$, thereby in detection of a signal from each TX, the interference from other transmitter may be cancelled if each transmitter sends its signal in the null space of the predetermined vectors $(v_{ref}^l)^H$ for l=1, . . . , $d_j$. For example, each rank-one UE computes a combining vector from the first vector $v_{ref}^1$ and the inverse of the cross channel, while a rank-two UE computes two combining vectors from the first two vectors, $v_{ref}^1$ and $v_{ref}^2$ and the inverse of the cross channel, and so on. In addition, each transmitter uses channel quality information (CQI) and equivalent direct channel matrix information $H_{i,j}^{eq}$ for the UEs to perform link adaptation and to precode data with a precoding matrix $V_i$ to cancel out interferences. In this way, interference alignment is performed at the UEs by using the combining vector to convert the cross channel to the predetermined sub-spaces. The result is indicated at the UE node 7 (denoted $UE_{L-2}$) where the desired signal from the second transmitter $TX_2$ 6 is received over direct channel $H_{2,L-2}$ by applying a first combining vector $r_{1,L-2}^l=(v_{ref}^l)^H H_{1,L-2}^+$ which effectively aligns the interfering signal over $H_{1,L-2}$ from the first transmitter $TX_1$ 2 to $(v_{ref}^l)^H$, when detecting the signal from the second transmitter $TX_2$ 6. In addition, the first receiver node 7 (denoted $UE_{L-2}$) can also receive a second desired signal from the first transmitter $TX_1$ 2 over direct channel $H_{1,L-2}$ by applying a second combining vector $r_{2,L-2}^l=(v_{ref}^l)^H H_{2,L-2}^+$ which effectively aligns the interfering signal over $H_{2,L-2}$ from the second transmitter $TX_2$ 6 to $(v_{ref}^l)^H$, when detecting the signal from the first transmitter $TX_2$ 2.

Interference Alignment for Case K≥M

As disclosed herein, the joint transmission interference alignment schemes can be used to serve L UEs with two transmitters $TX_i$ (i=1, 2) in cases where the number of receive antennas on the UEs is greater than or equal to the number of transmit antennas on the $i^{th}$ transmitter (e.g. K≥M) since all potentially interfering cross channels are invertible with a probability of almost one in a multipath rich propagation environment. The transmitter may select the UEs and their corresponding ranks $d_j$ such that, for each transmitter $TX_i$, its number of antennas (M) should not be less than the sum of the total number of transmission ranks D and the maximum rank $d_{max}$ ($d_{max}$=max $d_j$) of all the transmission ranks, i.e. M≥D+$d_{max}$. Also, the channel from the $i^{th}$ transmitter (i=1, 2) to the $j^{th}$ UE is denoted by the K×M matrices $H_{i,j}$. As a result, the received signal at the $j^{th}$ UE (j=1, . . . , L) can be written as $$y_j = H_{1,j} x_1 + H_{2,j} x_2 + n_j, \quad (1)$$

where the received signal $y_j$ contains a rank $d_j$ transmission from the $i^{th}$ transmitter, where $n_j$ is the noise at the $j^{th}$ UE, and where $x_i$ denotes the transmitted signal from the $i^{th}$ transmitter, i=1, 2. Both the channels $H_{1,j}$ and $H_{2,j}$ can be estimated at the $j^{th}$ UE using any desired technique, such as downlink pilot or reference signaling.

In this case where the number of UE receive antennas meets or exceeds the number of transmit antennas (K≥M), all channels $H_{i,j}$ are invertible with a probability of almost one in a multipath rich wireless propagation environment, meaning that the pseudo inverse of the channel $H_{i,j}$ is given by $H_{i,j}^+ = (H_{i,j}{}^H H_{i,j})^{-1} H_{i,j}{}^H$, such that $H_{i,j}^+ H_{i,j} = I$ where I denotes the identity matrix. As a result, each channel $H_{i,j}$ can be projected to a predetermined vector of size M, $v_{ref}$, in the case of single rank transmission by having each UE compute a combining vector $r_{i,j} = v_{ref}{}^H H_{3-i,j}^+$ and feed back an equivalent direct transmission channel vector $h_{i,j}^{ew} = v_{ref}{}^H H_{3-i,j}^+ H_{i,j}$. Each of the UEs and transmitters can store an "indexed" list of linearly independent vectors $V_{ref} = (v_{ref}^1, \ldots, v_{ref}^M)$, where $v_{ref}^l$ is an M×1 vector. In some implementations, $V_{ref}$ consists of orthogonal vectors. Alternatively, $V_{ref}$ can be considered as a set of basis vectors for the M-dimensional transmission space.

If the $y_j$ signal received at each $UE_{i,j}$ (Equation (1)) is processed by separately applying a first combining vector $(r_{1,j}^l = (v_{ref}^l)^H H_{1,j}^+$ for $l=1, \ldots, d_j)$ and a second combining vector $(r_{2,j}^l = (v_{ref}^l)^H H_{1,j}^+$ for $l=1, \ldots, d_j)$, the result is:

$$\tilde{y}_{j,1}^l = (v_{ref}^l)^H H_{2,j}^+ y_j = h_{1,j}^{l,eq} x_1 + (v_{ref}^l)^H x_2 + n_{j,1}^{l,eq},$$
$$j=1, \ldots, L \; l=1 \ldots, d_j \quad (2)$$

$$\tilde{y}_{j,2}^l = (v_{ref}^l)^H H_{1,j}^+ y_j = (v_{ref}^l)^H x_1 + h_{2,j}^{l,eq} x_2 + n_{j,2}^{l,eq},$$
$$j=1, \ldots, L \; l=1 \ldots, d_j \quad (3)$$

where the equivalent transmission channel matrix to the first transmitter $TX_1$ 2, corresponding to the lth data stream is $h_{1,j}^{l,eq} = (v_{ref}^l)^H H_{2,j}^+ H_{1,j}$, where the equivalent noise term from the first transmitter, corresponding to the $l^{th}$ lth data stream is $n_{j,1}^{l,eq} = (v_{ref}^l)^H H_{2,j}^+ n_j$, where the equivalent transmission channel matrix to the second transmitter $TX_2$ 6, corresponding to the $l^{th}$ data stream is $h_{2,j}^{l,eq} = (v_{ref}^l)^H H_{1,j}^+ H_{2,j}$, and where the equivalent noise term from the second transmitter, corresponding to the $l^{th}$ data stream is $n_{j,2}^{l,eq} = (v_{ref}^l)^H H_{1,j}^+ n_j$. Thus, Equations (2) and (3) represent matching filter equations for $d_j$ and $d_j$ independent or orthogonal vectors $v_{ref}^l$ applied to process the received $y_j$ signal to extract signals from the first and second transmitters, respectively.

Considering Equations (2) and (3) for all i=1, 2; j=1, ..., L; l=1, ..., $d_j$, the transmitted signal $x_1$ and the transmitted signal $x_2$ for a particular UE should be designed in the null space of $v_{ref}^l$ for l=1, ..., $d_j$ (the first $d_j$ vectors in the set $V_{ref}$) in order to cancel the interferences from signals intended to other UEs. By satisfying these constraints in designing the transmit signals $x_i$ and by applying the matched filters of $(v_{ref}^l)^H H_{3-i,j}^+ (i=1, 2)$, for the $j^{th}$ UE (j=1, ..., L), the received signals appear as $$\tilde{y}_{j,1}^l = h_{1,j}^{l,eq} x_1 + n_{j,1}^{l,eq}, j=1, \ldots, L \; l=1 \ldots, d_j \quad (4)$$

$$\tilde{y}_{j,2}^l = h_{2,j}^{l,eq} x_2 + n_{j,2}^{l,eq}, j=1, \ldots, L \; l=1 \ldots, d_j \quad (5)$$

As seen from Equation (4), by applying the corresponding matched filter, all interference from the second transmitter ($TX_2$ 6) to the $j^{th}$ UE can be aligned such that each UE can decode a signal of rank $d_j$ from the first transmitter ($TX_1$ 2). In other words, when UE decodes a signal of rank $d_j$ from $TX_1$ 2, the signal from $TX_2$ 6 is considered as interference. Similarly, according to Equation (5), all interference from $TX_1$ 2 to the $j^{th}$ UE can be aligned such that each UE can decode a signal of rank $d_j$ (again, when UE decodes a signal of rank $d_j$ from $TX_2$ 6, the signal from $TX_1$ 2 is considered as interference). With this approach, there is a probability of almost one that the vectors in $\{h_{1,j}^{l,eq}\}_{l=1}^{d_j}$ and $\{h_{2,j}^{l,eq}\}_{l=1}^{d_j}$ are all linearly independent. Since the $j^{th}$ UE may receive a transmission of rank $d_j$, to accommodate the largest rank from either transmitters, i.e., $d_{max}$, the indexed vector set $V_{ref}$ at the $j^{th}$ UE may have at least $d_{max}$ independent vectors $v_{ref}^l$ to achieve a multiplexing gain of $d_j$ from the $i^{th}$ transmitter. On the other hand, the $i^{th}$ transmitter can provide total D degrees of freedom for its users. This may correspond to the $i^{th}$ transmitter having at least D+$d_{max}$ antennas.

With this scheme, the problem is reduced to DL MU-MIMO with the equivalent channel $$H_{i,j}^{eq} = [h_{i,j}^{1,eq\,T} \ldots h_{i,j}^{d_j,eq\,T}]^T, \quad (6)$$

where $h_{i,j}^{l,eq} = (v_{ref}^l)^H H_{3-i,j}^+ H_{i,j}$ for the $j^{th}$ UE (j=1, ..., L) with $d_{max}$ dimensions reserved for interference alignment. As a result, each UE j estimates its channels to the transmitters $H_{i,j}$, and then feeds back the equivalent direct transmission channel matrices $H_{1,j}^{eq}$ and $H_{2,j}^{eq}$ to each transmitter $TX_i$, either directly or with an indication of the matrix or of its vectors using code-book based or non-code-book based techniques. Alternatively, each transmitter $TX_i$ operating in time division duplexing (TDD) mode can estimate $h_{i,j}^{l,eq}$ from the uplink channel if the $UE_{i,j}$ sends multiple pilot signals in the direction of the transpose of the combining vector $(r_{i,j}^l)^T$, where $(.)^T$ denotes the transpose operation.

Once the transmitters acquire the equivalent direct transmission channel matrices $H_{i,j}^{eq}$ from all UEs, transmit data for L UEs indexed by $(s_1, \ldots, s_L)$ may be used to construct the transmitted signal $x_i$ using any desired DL-MU-MIMO technique, such as zero-forcing or dirty paper coding (DPC).

In an illustrative example where zero-forcing precoding is used, the $i^{th}$ transmitter (for i=1, 2) may be configured to construct the transmitted signal $x_i$ using a precoding matrix $V_i$ formed with the first D columns in the inverse of the matrix $P_i$ of dimension (D+$d_{max}$)×M, where $$P_i = \begin{bmatrix} H_{i,1}^{eq} \\ \vdots \\ H_{i,L}^{eq} \\ v_{ref}^{1\,T} \\ \vdots \\ v_{ref}^{d_{max}\,T} \end{bmatrix} \quad (7)$$

The resulting transmitted signal is:

$$x_i = V_i s \quad (8)$$

In Equation (8), $V_i = [v_{i,1} \ldots v_{i,L}]$ is the first D columns of the matrix $P_i^+ = P_i{}^H (P_i P_i{}^H)^{-1}$, where $v_{i,j}$ is the precoding matrix of size M×$d_j$ for the $j^{th}$ user in which the $l^{th}$ column (l=1, ..., $d_j$) of this matrix is denoted by $v_{i,j}^l$. In addition, $s = [s_1 \ldots s_L]$ represents data symbols to be transmitted at $TX_1$ 2 and $TX_2$ 6 and $s_j$ is a vector of size $d_j$×1 representing a rank-$d_j$ signal that should be transmitted to user j. With this precoding scheme, the $j^{th}$ UE (j=1, ..., L) can decode its $l^{th}$ data stream from the $i^{th}$ transmitter (i=1, 2) using single-user detection algorithms using $$\tilde{y}_{j,1}^l = h_{i,j}^{l,eq} v_{i,j}^l s_j^l + n_{j,i}^{l,eq}, \quad (9)$$

where $s_j^l$ denotes the $l^{th}$ data stream sent to the $j^{th}$ UE from the $i^{th}$ transmitter and $h_{i,j}^{l,eq} v_{i,j}^l$ can be considered as the equivalent channel for the $l^{th}$ stream of $j^{th}$ UE from the transmitters. Each UE can calculate the equivalent channels using reference signals, such as specified, or the choice of precoding matrix/vector can be signaled to the UE.

Based on the interference alignment scheme described above, since both $TX_1$ 2 and $TX_2$ 6 transmit the same data to the $j^{th}$ user, a diversity combining technology may be used for decoding the transmitted data. The diversity combining technology may take advantage of different copies of the same transmit data through different frequency, time and/or spatial channels, process the different copies with corresponding weighting coefficients to increase/maximize the output SNR. In some implementations, maximal ratio combing (MRC) technique may be use. Using the example illustrated in FIG. 1, the $l^{th}$ data stream of $s_j$, may be denoted as $s_j^l$, the $j^{th}$ UE may first combine the $l^{th}$ component of $\tilde{y}_{j,1}$ and $\tilde{y}_{j,2}$, denoted by $\tilde{y}_{j,1}^l$ and $\tilde{y}_{j,2}^l$, respectively, to generate output data as follows:

$$z_j^l = \frac{v_{1,j}^{l}{}^H h_{1,j}^{l,eq}{}^H}{|(v_{ref}^l)^H h_{2,j}^+|}\tilde{y}_{j,1}^l + \frac{v_{2,j}^{l}{}^H h_{2,j}^{l,eq}{}^H}{|(v_{ref}^l)^H h_{1,j}^+|}\tilde{y}_{j,2}^l \qquad (10)$$

to reveal:

$$z_j^l = \left(\frac{|h_{1,j}^{l,eq} v_{1,j}^l|^2}{|(v_{ref}^l)^H h_{2,j}^+|} + \frac{|h_{2,j}^{l,eq} v_{2,j}^l|^2}{|(v_{ref}^l)^H h_{1,j}^+|}\right)s_j^l + w_j^l, \qquad (11)$$

where $v_{1,j}^l$ and $v_{2,j}^l$ denote the $l^{th}$ column of $v_{1,j}$ and $v_{2,j}$ respectively, $$\frac{v_{1,j}^{l}{}^H h_{1,j}^{l,eq}{}^H}{|(v_{ref}^l)^H h_{2,j}^+|} \text{ and } \frac{v_{2,j}^{l}{}^H h_{2,j}^{l,eq}{}^H}{|(v_{ref}^l)^H h_{1,j}^+|}\tilde{y}_{j,2}^l$$

are the weighting coefficients applied to the decoded signals $\tilde{y}_{j,1}^l$ and $\tilde{y}_{j,2}^l$ after interference alignment, and $$w_j^l \triangleq \frac{v_{1,j}^{l}{}^H h_{1,j}^{l,eq}{}^H}{|(v_{ref}^l)^H h_{2,j}^+|}n_{j,1}^{l,eq} + \frac{v_{2,j}^{l}{}^H h_{2,j}^{l,eq}{}^H}{|(v_{ref}^l)^H h_{1,j}^+|}n_{j,2}^{l,eq}$$

is the noise after applying the weighting coefficients. In some implementations, $v_{1,j}^{l}{}^H h_{1,j}^{l,eq}{}^H$ and $v_{2,j}^{l}{}^H h_{2,j}^{l,eq}{}^H$ included in the weighting coefficients may be estimated by the UEs based on pilot signals transmitted from $TX_1$ 2 and $TX_2$ 6, where the interference alignment scheme is applied to the pilot signals before the pilot signals are transmitted to the UEs. Using Equation (11), the $j^{th}$ UE can decode $s_j^l$, based on its estimation of $h_{1,j}^{l,eq} v_{1,j}^l$ and $h_{2,j}^{l,eq} v_{2,j}^l$. The maximum total number of data streams transmitted in this scheme can be obtained as $M-d_{max}$. For example, in the case of single-layer transmission to each UE, $M-1$ data streams are totally transmitted.

In some implementations, an optimum combining technique may be used. The optimum combining weighting coefficient may be obtained by using exhaustive search and look up table at the $j^{th}$ UE. The optimum combining weighting coefficient may be derived based on the equivalent channels $h_{1,j}^{l,eq} v_{1,j}^l$ and $h_{2,j}^{l,eq} v_{2,j}^l$, and/or the correlation coefficient between the noise terms. For example, assume that the following combining technique is used:

$$z_j^l = \tilde{y}_{j,1}^l + \beta_j^l \tilde{y}_{j,2}^l = (h_{1,j}^{k,eq} v_{1,j}^l + \beta_j^l h_{2,j}^{l,eq} v_{2,j}^l)s_j^l + (n_{j,1}^{l,eq} + \beta_j^l n_{j,2}^{l,eq}), \qquad (12)$$

where $\beta_j^l$ is a complex number weighting coefficient to be optimized. The optimal value of $\beta_j^l$ may maximize the effective SNR which can be computed from the following equation:

$$\beta_j^{l*} = \text{argmax}_\beta \frac{|h_{1,j}^{l,eq} v_{1,j}^l + \beta h_{2,j}^{l,eq} v_{2,j}^l|^2}{|(v_{ref}^l)^H H_{2,j}^+|^2 + |\beta|^2|(v_{ref}^l)^H H_{1,j}^+|^2 +} \qquad (13)$$
$$2\beta|(v_{ref}^l)^H H_{2,j}^+||(v_{ref}^l)^H H_{1,j}^+|\text{cov}(n_{j,1}^{l,eq}, n_{j,2}^{l,eq})$$

where $$\text{cov}(x, y) = \frac{E[x^H y]}{\sqrt{\text{var}(x)\text{var}(y)}},$$

and the maximization can be found by exhaustive search using a lookup table.

In some implementations, e.g., joint UE soft handover, both transmitters may send the same transmit data to a plurality of UEs in a handover phase. Space time block code (STBC) may be used to jointly encode the transmit data at $TX_1$ 2 and $TX_2$ 6. Using L=2 as an example, and applying STBC to the transmit data, equations (9) may then be expressed as $$\tilde{y}_{j,1}^l = h_{1,j}^{l,eq}[v_{1,1} \quad v_{1,2}]\begin{bmatrix}s_{11}\\s_{12}\end{bmatrix} + n_{j,1}^{l,eq}, j = 1, 2 \qquad (14)$$
$$l = 1, \ldots, d_j$$

$$\tilde{y}_{j,2}^l = h_{2,j}^{l,eq}[v_{2,1} \quad v_{2,2}]\begin{bmatrix}s_{21}\\s_{22}\end{bmatrix} + n_{j,2}^{l,eq}, j = 1, 2 \qquad (15)$$
$$l = 1, \ldots, d_j,$$

where $s_{ij}$ is the $d_j \times 1$ vector of transmitted signal from the $i^{th}$ transmitter to the $j^{th}$ UE. As such, for both UEs, for the joint transmission schemes $s_1 = s_{21}$ and $s_{12} = s_{22}$. Transmission of the same data to both UEs can be implemented in symbol level or bit level. In case of bit level, $s_{11}$ and $s_{21}$, (and/or $s_{12}$ and $s_{22}$) are not equal but they convey the same information bits. Accordingly, any combining technique including chase combining (with two bit sequences that are the same) or incremental redundancy combining (with two bit sequences that are two revisions of a same bit stream) between $s_{11}$ and $s_{21}$ (and/or $s_{12}$ and $s_{22}$) may be implemented. In other words, since the two streams $s_{11}$ and $s_{21}$ (and/or $s_{12}$ and $s_{22}$) may be the same, any technique that can be used for HARQ in 3GPP LTE or other standards can be used in the various implementations of the disclosure. Furthermore, the UEs can use this a priori knowledge (i.e., the same data sent from both transmitters) to improve the detection performance, similar to the case of handing over one UE.

Using bit-level implementations, the corresponding symbols for $s_{11}$ and $s_{21}$ (and/or $s_{12}$ and $s_{22}$) may not be the same. In contrast, in symbol level implementations, the two sequences of $s_{11}$ and $s_{21}$ (and/or $s_{12}$ and $s_{22}$) may be the same. In some instances, more sophisticated algorithms may be implemented for symbol-level implementations. For example, since the two base stations send the same data, they can transmit using diversity techniques accordingly.

In some implementations, some UEs may operate in a diversity mode during soft handover, while other UEs may operate in a spatial multiplexing mode. For UEs operating in the diversity mode, it can be expressed that $s_{1,j}^l = s_{2,j}^l$, for $l=1, \ldots, d_j$, and diversity combining techniques (e.g., MRC, optimum combining as described above) may be performed. For UEs operating in the spatial multiplexing mode, different data is transmitted from different transmitters, i.e. $s_{1,j}^l \neq s_{2,j}^l$, and similar procedure may be performed for interference alignment by replacing s in Equation (8) with different transmit data for the different spatial channels. In some implementations, different UEs may be associated with different transmission ranks, a subset of data streams can be transmitted from both transmitters using diversity combining, and the rest of the data streams may be transmitted from one transmitter.

The interference alignment schemes disclosed herein may be considered as an improved MU-MIMO technique. In some instances, some feedback schemes and enhancement techniques that exist for MU-MIMO scenarios in 3GPP Release 8 or later can be used here. For example, in addition to feeding back equivalent direct channel matrix information $H_{i,j}^{eq}$, each UE may feed back additional information to its affiliated transmitter, such as LTE Release 8 Rank Indicator (RI), Channel Quality Indicator (CQI), or redefined CQI for MU-MIMO in LTE-A, which is used by the transmitter $TX_i$ for scheduling and link adaptation. One example would be to have each UE feed back a threshold, such as the effective noise power (e.g., $E\{\|n_{j,i}^{eq}\|^2\}$) or its inverse (e.g., $$\frac{1}{E\{\|n_{j,i}^{eq}\|^2\}}),$$

where $n_{j,i}^{eq} = [n_{j,i}^{1,eq} \ldots n_{j,i}^{d_j,eq}]$ and where $E\{.\}$ denotes the expectation. Also, rank indicator (RI) information (or equivalently $d_j$) can be estimated and reported back to the transmitter by UE $j=1, \ldots, L$. Therefore, according to RI, each UE could send multiple CQIs for each one of RI data streams based on the effective received SNR. With this information, transmitters can perform scheduling, pairing, and link adaptation for the selected UEs by calculating the effective SNR for each one of RI data streams. In some implementations, the effective SNR for each one of RI data streams can be calculated as $$SNR_{j,i}^l = \frac{P_i \|h_{i,j}^{Leq} v_{i,j}^l\|^2}{DE\{|n_{j,i}^{Leq}|^2\}}, \quad (16)$$

where $P_i$ is the transmitted total power for transmitter i, D is total number of layers transmitted by the transmitters, and the power is equally divided to each layer. While the additional RI information may be fed back to the transmitter, it will be appreciated that the transmitter can decide on the RI and use this information for scheduling, pairing, and link adaptation.

In support of UE scheduling, each UE can measure and estimate the direct channel to the serving transmitter. Using the same procedure as 3GPP LTE release 8 or 10, each UE determines the rank of the channel, $d_j$. This rank determines that the UE can receive a signal up to rank $d_j$. Each UE can also report back $d_j$ as RI information and multiple CQI for each one of $d_j$ data streams. As part of scheduling operations, each transmitter selects different UEs with rank $d_j$. At least one of $TX_1$ 2 or $TX_2$ 6 can also assign $d_j$ to UE j. It can assign this value considering other UEs in the cell and UE's transmission status.

According to CQI and RI (equivalently $d_j$) for different users, at least one of $TX_1$ 2 or $TX_2$ 6 can schedule users such that the number of transmit antennas is not less than the sum of data streams provided to the users and the reserved data ranks for interference, i.e. $M \geq D + d_{max}$, where D is the degrees of freedom that the transmitters provide for the UEs. In this case, each transmitter should know the maximum rank that the other transmitter is providing to users (i.e., $d_{max}$). This information can be exchanged between transmitters or there can be a pre-defined setting that transmitters follow. In some implementations, they can agree on a pre-defined value, e.g., $d_{max}$.

By having each UE compute and apply a first combining vector $(r_{1,j}^l = (v_{ref}^l)^H H_{2,j}^+)$ for $l=1, \ldots, d_j$) and a second combining vector $(r_{2,j}^l = (v_{ref}^l)^H H_{1,j}^+$ for $l=1, \ldots, d_j$), any interfering cross channels from the first transmitter $TX_1$ 2 and second transmitter $TX_2$ 6 are respectively projected to the respective predetermined subspace span $\{(v_{ref}^l)^H\}$, thereby allowing a UE to decode a data streams sent by both transmitters using precoding matrix $V_i$ (from Equation (8)).

Figure 2:
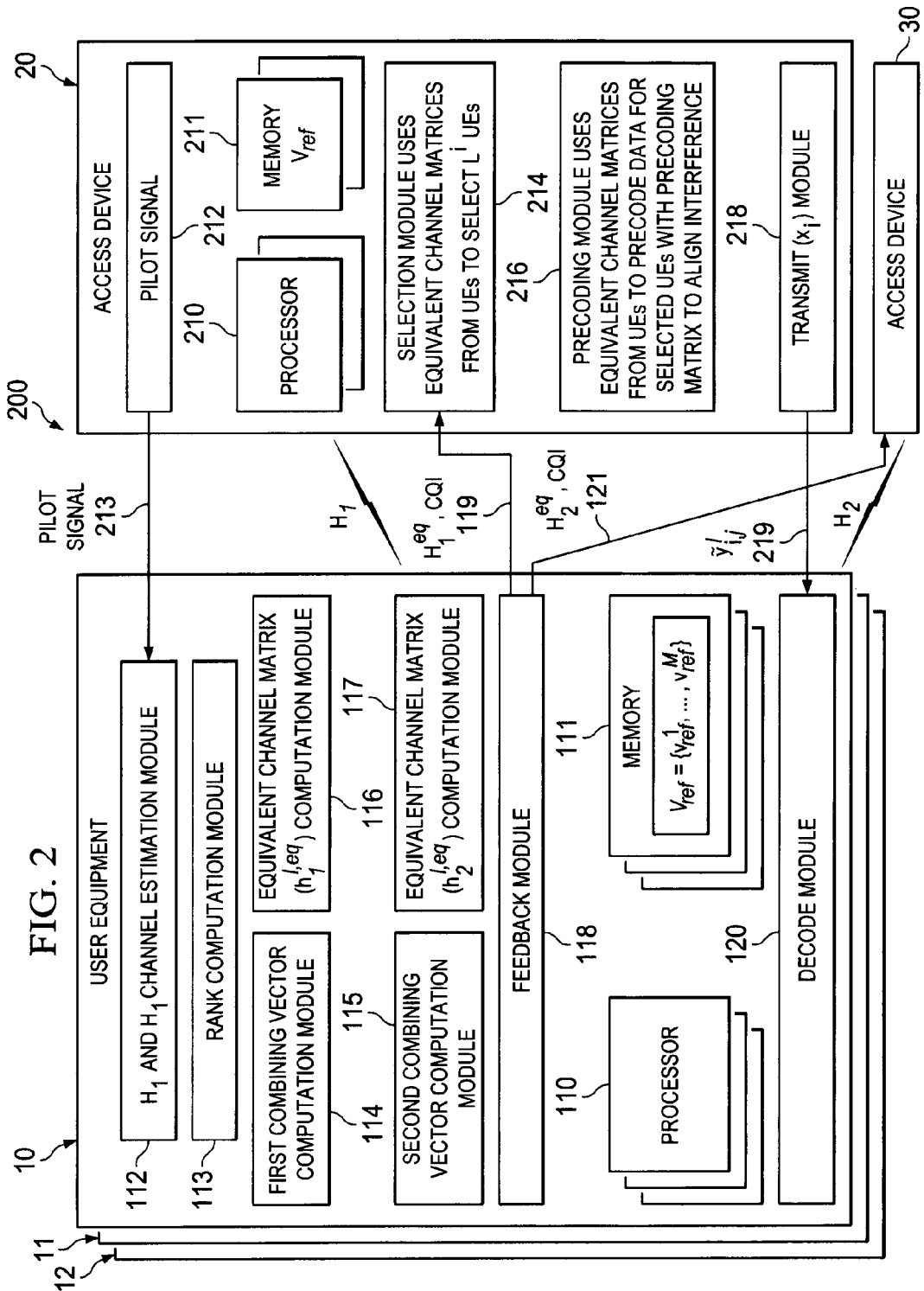
FIG. 2 is a schematic diagram showing example components of wireless communication devices suitable for some implementations of the present disclosure.

To understand how a plurality of linearly independent reference vectors $(v_{ref}^l)^H$ may be used to align interference in the network 100, reference is now made to FIG. 2. FIG. 2 is a schematic diagram 200 showing example components of wireless communication devices suitable for some implementations of the present disclosure. The example 200 shown in FIG. 2 includes two access devices 20, 30 which may jointly transmit signals to the UE (UE) devices 10-12 such that all crossed channels from the transmitters are aligned to the predetermined sub-spaces at each receiver. To this end, each of the UEs 10-12 is configured to determine, for each transmitter, a rank indicator, and to compute therefrom corresponding equivalent channel matrix information $H_{i,j}^{eq}$ from a plurality of linearly independent reference vectors $(v_{ref}^l)^H$. After feeding back the equivalent direct channel matrix information $H_{i,j}^{eq}$ to the access devices 20, 30, each access device 20, 30 constructs its transmission signal $x_i$ by precoding the transmit data in the null space of $(v_{ref}^l)^H$ so that no interference is imposed to the UEs in the other cell. For purposes of transforming the transmit data and signals as described herein, the UE 10 includes, among other components, one or more processors 110 that run one or more software programs or modules embodied in circuitry and/or non-transitory storage media device(s) 111 (e.g., RAM, ROM, flash memory, etc.) to communicate to receive data from, and to provide data to, access devices 20, 30. When data is transmitted from UE 10 to access device 20, the data is referred to as uplink data and when data is transmitted from access device 20 to UE 10, the data is referred to as downlink data.

As part of the MIMO downlink process, the UE 10 determines, quantifies or estimates the channel matrices $H_1$ and $H_2$ which respectively represent the channel impulse responses between the first access device 20 and second access device 30 and the UE. For example, the channel matrix $H_1$ can be represented by a K×M matrix of complex coefficients, where M is the number of transmit antennas in the first access device 20 and K is the number of receive antennas in the UE 10. Alternatively, the channel matrix H, can instead be represented by an M×K matrix of complex coefficients, in which case the matrix manipulation algorithms are adjusted accordingly. The coefficients of the channel matrix $H_1$, depend, at least in part, on the transmission characteristics of the medium, such as air, through which a signal is transmitted. A variety of methods may be used at the receiver to determine the channel matrix $H_1$ and $H_2$ coefficients, such as transmitting a known pilot signal to a receiver so that the receiver, knowing the pilot signal, can estimate the coefficients of the channel matrix $H_1$ and $H_2$ using well-known pilot estimation techniques. Alternatively, when the channel between the transmitter and receiver are reciprocal in both directions, the actual channel matrix $H_1$ is known to the receiver and may also be known to the transmitter. To this end, each access device (e.g., 20) may include a pilot signal generator (e.g., 212) for generating and transmitting a pilot signal 213. In addition, each UE 10 may include a channel estimation module 112 using hardware and/or software executed by one or more processor elements to determine or estimate the channel matrices $H_1$ and $H_2$ from the access devices 20, 30.

At the UE 10, a rank computation module 113 is provided for computing or determining a rank indicator (RI or equivalently d) for each potential transmission from the access devices 20, 30. In addition, the UE 10 includes one or more combining vector computation modules for computing or retrieving first and second combining vectors $r_1^l$ and $r_2^l$ to be used for receiving signals from the access devices 20, 30. In the cases where the UE antenna count K is at least equal to the access device antenna count M, the estimated channel matrices $H_1$ and $H_2$ to access devices 20, 30 may be used to compute the first and second combining vectors $r_1^l$ and $r_2^l$, respectively. For example, a first combining vector computation module 114 may be provided for computing the pseudo inverse of the estimated channel matrix $H_2$, or $H_2^+$. Next, an arbitrary set of linearly independent reference vectors $V_{ref} = \{v_{ref}^1, \ldots, v_{ref}^M\}$, each of size M, is defined or obtained, where the reference vector set $V_{ref}$ is known to all UEs and transmitters because it was signaled or pre-determined. In one implementation, $V_{ref}$ consists of orthogonal reference vectors are stored in memory 111. Assuming a signal of rank-d should be received by UE 10, after determining the Hermitian transpose of d reference vectors from the reference vector set, $(v_{ref}^l)^H$ for $l=1, \ldots, d$, the first combining vector computation module 114 then computes the combining vector $r_1^l = (v_{ref}^l)^H H_2^+$ for $l=1, \ldots, d$. In similar fashion, a second combining vector computation module 115 may be provided for using the estimated channel matrix $H_1$ to compute the second combining vector $r_2^l = (v_{ref}^l)^H H_1^+$ for $l=1, \ldots, d$.

The UE 10 also includes one or more equivalent channel matrix computation modules which multiply the combining vector $r_i^l$ and estimated direct channel matrix $H_i$ to compute the equivalent channel matrix $H_i^{eq}$ where its $l^{th}$ row (the equivalent channel matrix for each data stream) is calculated by $h_i^{l,eq} = r_i^l H_i = (v_{ref}^l)^H H_{3-i}^+ H_i$. For example, a first equivalent channel matrix computation module 116 may be provided for computing $h_1^{l,eq} = (v_{ref}^l)^H H_2^+ H_1$, and a second equivalent channel matrix computation module 117 may be provided for computing $h_2^{l,eq} = (v_{ref}^l)^H H_1^+ H_2$. The UE 10 may feed back the equivalent channel matrices $H_1^{eq}$ and $H_2^{eq}$ to each of the access devices 20, 30, which also receive equivalent channel matrix information from the other affiliated UEs 11, 12. In selected implementations, the feedback module 118 sends the equivalent channel matrices $H_1^{eq}$ and $H_2^{eq}$ with uplink messages 119, 121. Alternatively, when TDD mode is used, each access point can estimate the equivalent channel matrix $H_{i,j}^{eq}$ from the uplink channels if the UE sends the multiple pilot signals in the direction of $(r_i^l)^T$. The feedback module 118 may also send RI and multiple CQI information (such as an indication of effective noise power) in the uplink messages 119, 121 to each access device 20, 30 based on the computed rank for each access device for use in scheduling and link adaptation.

At the access device 20, the acquired equivalent channel matrices $H_i^{eq}$ and RI/CQI information are processed and transformed by one or more processors 210 that run one or more software programs or modules embodied in circuitry and/or non-transitory storage media device(s) 211 (e.g., RAM, ROM, flash memory, etc.). For example, after receiving the equivalent channel matrices $H_i^{eq}$ and any RI or CQI information from all affiliated UEs 10-12, the access device 20 processes the feedback information to avoid any co-channel interference to non-affiliated UEs. To this end, a selection module 214 at the access device 20 and/or 30 uses the acquired equivalent channel matrices and any RI and CQI information to select a subset of L UEs out of a total of NUEs. The selected L UEs are indexed by $(s_1, \ldots, s_L)$. In addition, the access device 20 includes a precoding module 216 which uses the equivalent channel matrices to construct or precode a transmit signal $x_i = V_i s$, where $V_i$ denotes the precoding matrix for the $i^{th}$ transmitter or access device and s represents data symbols to be transmitted at both $TX_1$ and $TX_2$. In particular, the precoding module 216 may compute the precoding matrix $V_i$ by computing matrix P, computing the matrix $P^+$, and then selecting the first D columns of the inverse matrix $P^+$, where D is the sum of the transmission ranks for all the selected UEs ($D = \sum_{j=1}^{L} d_j$). Assuming zero-forcing precoding, the access device 20 may be configured as the ith transmitter to compute matrix P of dimension $(D + d_{max}) \times M$, as $$P_i = \begin{bmatrix} H_{i,1}^{eq} \\ \vdots \\ H_{i,L}^{eq} \\ v_{ref}^{1T} \\ \vdots \\ v_{ref}^{d_{max}^T} \end{bmatrix},$$

followed by computation of the inverse matrix $P_i^+ = P_i^H (P_i P_i^H)^{-1}$, followed by the selection of the first D columns of matrix $P_i^+$ to form the precoding matrix $V_i = [v_{i,1} \ldots v_{i,L}]$, where $v_{i,j}$ is the precoding matrix of size $M \times d_j$ for the $j^{th}$ user with the $l^{th}$ column ($l=1, \ldots, d_j$) of this matrix denoted by $v_{i,j}^l$. Though not shown, there may also be scheduling and link adaptation performed on the data symbols $s_i$ at the precoding module 216 or transmit module 218. As the precoded data $x_i$ is transmitted over a downlink message 219 to the UE 10, it is received at the decode module 120 by applying the first and second combining vectors $r_1^l$ and $r_2^l$ to appear as the received signals $\tilde{y}_{j,i}^l = h_{i,j}^{l,eq} v_{i,j}^l s_j^l + n_{j,i}^{l,eq}$ in which the inter-cell and intra-cell interference are cancelled. As a result, the UE 20 can decode data from the received signal $\tilde{y}_j^l$ using the first and second combining vectors $r_1^l$ and $r_2^l$ to implement single user detection algorithms.

Figure 3:
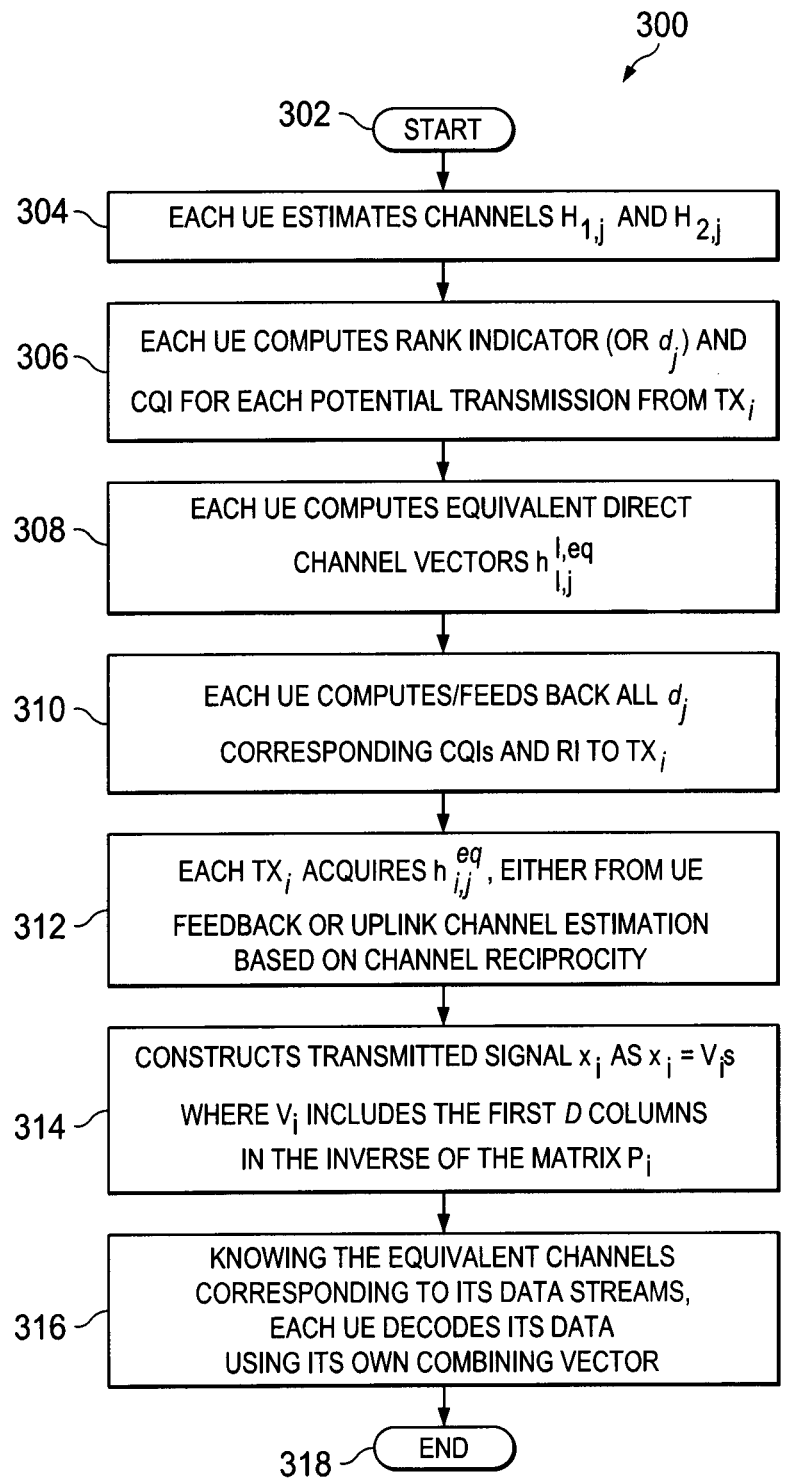
FIG. 3 is a flow chart illustrating an example compound multi-user interference alignment process that may be performed when the number of receiver antennas is greater than or equal to the number of transmitter antennas.

FIG. 3 is a flow chart 300 illustrating an example compound multi-user interference alignment process that may be performed when the number of receiver antennas is greater than or equal to the number of transmitter antennas. Once the procedure starts (step 302), each UE device estimates or computes at (step 304) the channels $H_{1,j}$ and $H_{2,j}$ to the $UE_j$ device from potentially interfering transmitters $TX_1$ and $TX_2$. Channel information may be computed using pilot estimation techniques.

At step 306, each UE device computes the rank indicator (RI) for each potential transmission stream from the ith transmitter. Alternatively, each UE device computes $d_j$ for each potential transmission stream from the $i^{th}$ transmitter.

At step 308, each UE computes the first and second combining vectors $r_{i,j}^l$ for each data stream received over the channels $H_{1,j}$ and $H_{2,j}$, such as by multiplying the Hermitian reflection of the shared reference vectors $v_{ref}^l$ (for $l=1, \ldots, d_j$) and the pseudo inverse of the channel $H_{3-i,j}^+$. The first and second combining vectors $r_{i,j}^l$ are then multiplied with the received signal to compute $\tilde{y}_{j,i}^l$ from Equations (2) and (3). In addition, each UE device computes the equivalent direct channel vectors $h_{i,j}^{l,eq}$ based on the estimated channels $H_{i,j}$ and the computed combining vectors $r_{i,j}^l$.

At step 310, each UE device computes and feeds back all the $d_j$ corresponding CQIs for each potential transmission stream from the ith transmitter.

At step 312, each transmitter $TX_i$ acquires the equivalent channel vector information $h_{i,j}^{l,eq}$ along with any channel quality indicator (CQI), either directly or indirectly using codebook or non-codebook feedback techniques by UEs or through uplink channel estimation and channel reciprocity. With this information, each transmitter $TX_i$ computes equivalent channel $$H_{i,j}^{eq} = \left[ h_{i,j}^{1,eq^T} \ldots h_{i,j}^{d_j,eq^T} \right]^T$$

for the affiliated UE devices. In some implementation, each transmitter $TX_i$ may also perform UE selection based on feedback information from the UEs, and then compute the equivalent direct channel vectors $h_{i,j}^{l,eq}$ for generating the transmit signal to the UEs.

At step 314, the transmitters may then construct transmit signals $x_i$ based on s for the L UEs. In some implementations, the transmit signals $x_i$ are constructed using a precoding matrix technique (such as described at Equations (7) and (8)) and/or link adaptation technique (such as described herein)), and then transmitted as downlink data to the UEs. The transmit signals $x_i$ may be constructed as $x_i = V_i s$ where $V_i$ includes the first D columns in the inverse of the matrix $P_i$.

At step 316, each UE uses its own equivalent channels $h_{i,j}^{l,eq}$ for $l=1, \ldots, d_j$, to decode its transmitted signals $x_i$ which appears as a receive signal vector $\tilde{y}_{i,j}^l = h_{i,j}^{l,eq} v_{i,j}^l s_j^l + n_{i,j}^{l,eq}$. In order to decode the receive signal vector, each UE may know or derive its own precoding vectors $v_{i,j}^l$ for $l=1, \ldots, d_j$. At step 318, the process ends.

Interference Alignment for Case K<M

In addition to the foregoing, selected implementations may also implement the disclosed joint transmission interference alignment schemes in cases where the number of antennas on the transmitters is greater than the number of receive antennas on the UE (e.g. K<M), provided that adjustments are made to match or correlate the channels $H_{i,j}$ with the predetermined vectors $(v_{ref}^l)^H$. The adjustments are required because the cross channels $H_{i,j}$ are not invertible in the case where the UE antenna count K is less than the access device antenna count M, and as a result, combining vectors $r_{i,j}^l$ (described above) cannot be used to match the equivalent cross channels perfectly to the predetermined vectors $(v_{ref}^l)^H$. To address this matching problem, a number of adjustment schemes may be used.

Euclidean Distance Minimization

In a first adjustment scheme, Euclidean Distance Minimization (EDM) techniques may be used to find or compute an EDM combining vector $r_{i,j}^l$ which minimizes the Euclidean distance of the equivalent interference channel $(r_{i,j}^l H_{3-i,j})$ for the $l^{th}$ data stream of each UE to $(v_{ref}^l)^H$. Referring to FIG. 2, the EDM technique may be implemented by the combining vector computation module 114 at each UE to compute the combining vector for the $l^{th}$ data stream to solve the optimization problem:

$$r_{i,j}^l = \arg\min_r \| H_{3-i,j}^H r^H - v_{ref}^l \|^2 \quad (17)$$

$$\text{s.t.} \quad \| H_{3-i,j}^H r^H \|^2 = 1,$$

One computation solution for computing the EDM combining vector is:

$$r_{i,j}^l = \frac{(v_{ref}^l)^H H_{3-i,j}^+}{\|(v_{ref}^l)^H H_{3-i,j}^+ H_{3-i,j}\|}. \quad (18)$$

where $H_{3-i,j}^+ = H_{3-i,j}^H (H_{3-i,j} H_{3-i,j}^H)^{-1}$ such that $H_{3-i,j}^+$ is defined such that $H_{3-i,j} H_{3-i,j}^+ = I$.

Once the EDM combining vector $r_{i,j}^l$ is computed, the equivalent direct channel matrix for each stream is computed as follows:

$$h_{i,j}^{l,eq} = \frac{(v_{ref}^l)^H H_{3-i,j}^+ H_{i,j}}{\|(v_{ref}^l)\|^H H_{3-i,j}^+ H_{3-i,j}}, l = 1, \ldots, d_j. \quad (19)$$

The remaining processing at the UE 10 and access device 20 proceeds substantially as described with reference to steps 310-318 in the process 300 depicted in FIG. 3 except the fact that the calculation of CQI will be affected by the amount of inter-cell interference since the inter-cell interference cannot be cancelled completely. As a result, the computation of effective SNR at the transmitter for scheduling and link adaptation may be replaced by computing an effective signal to interference plus noise ratio (SINR) as follows:

$$SINR_{i,j}^{l,eff} = \frac{\frac{P_i}{D} |h_{i,j}^{l,eq} v_{i,j}^l|^2}{\frac{P_{3-i}}{M-1}(1 - |r_{i,j}^l H_{3-i,j} v_{ref}^l|^2) + E\{|n_{i,j}^{l,eq}|^2\}}, \quad (20)$$

where $P_{3-i}$ refers to interfering power from the "other" transmitter, $h_{i,j}^{l,eq}$ is defined in Equation (19), $r_{i,j}^l$ is obtained as in Equation (18), and $v_{i,j}^l$ is the precoding vector for the $l^{th}$ data stream of the UE (i,j). As a result of this adjustment, the CQI computation at the can be modified to capture the inter-cell interference term $$\frac{P_{3-i}}{M-1}(1 - |r_{i,j}^l H_{3-i,j} v_{ref}^l|^2).$$

Time/Frequency Extension

In a second adjustment scheme for cases where the number of antennas on the eNB is greater than the number of receive antennas on the UE (e.g. K<M), the interfering channels of UEs are extended in time or frequency domain such that the aggregate channel becomes invertible. For example, in OFDM systems like LTE or LTE-Advanced systems, the channels $H_{i,j}$ can be extended by using time/frequency resource elements. By extending the time/frequency of the channels $H_{i,j}$, each UE can compute and use the first and second combining vectors $r_{i,j}^l$ to match the extended cross channels $H_{i,j}$ to the predetermined vectors $(v_{ref}^l)^H$.

Figure 4:
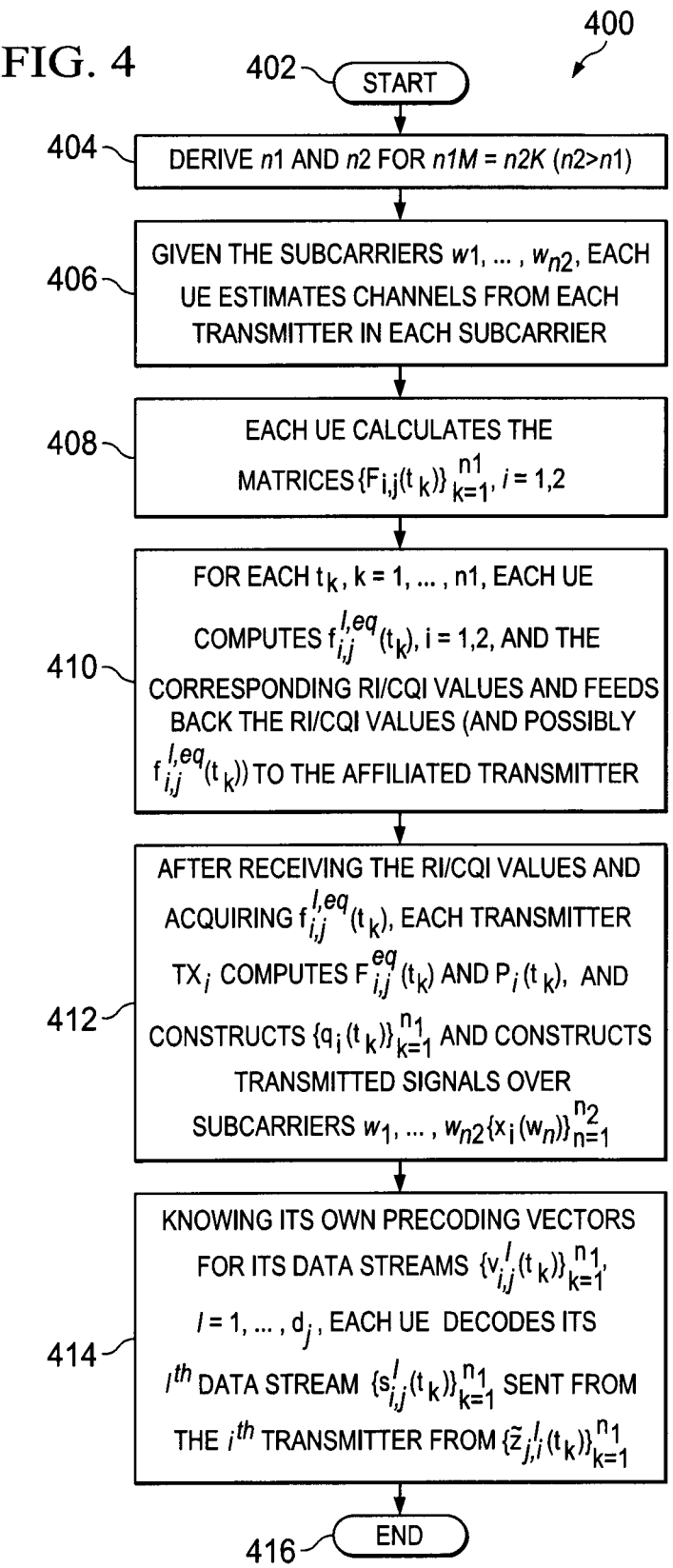
FIG. 4 is a flow chart illustrating an example downlink compound multi-user interference alignment process that may be performed to extend the interfering channels in frequency when the number of receiver antennas is less than the number of transmitter antennas.

To illustrate an example interference alignment process that may be performed to extend the interfering channels in frequency, reference is now made to FIG. 4. FIG. 4 is a flow chart 400 illustrating an example downlink compound multi-user interference alignment process that may be performed to extend the interfering channels in frequency when the number of receiver antennas is less than the number of transmitter antennas. Once the procedure starts (step 402), each UE effectively extends the interfering channels by finding or deriving n1 and n2 (at step 404) that are the smallest integer numbers such that:

$$n1M = n2K \ (n2 > n1). \tag{21}$$

For example, if M=4 and K=2, then we have n1=1 and n2=2.

At step 406, each UE estimates or computes the channels $H_{i,j}$ in each of the subcarriers $w_1$ to $w_{n2}$ of the channels between the UE and potentially interfering transmitters $TX_1$ and $TX_2$. The channel estimation module 112 shown in FIG. 2 may be used here to implement pilot signal estimation or any other desired channel estimation technique.

At step 408, each UE computes extended channel matrix information. The combining vector computation module 114 shown in FIG. 2 may be used to compute the extended channel matrix information. To implement frequency extension, the channel of the $j^{th}$ UE to $TX_i$ in the subcarriers $w_1$ to $w_{n2}$ may be denoted as $\{H_{i,j}(w_k)\}_{k=1}^{n2}$, where it is understood that a subcarrier refers to a frequency unit or band. With this approach, the aggregate cross channel is defined as $$H_{i,j} \triangleq [H_{i,j}(w_1)^T | \ldots | H_{i,j}(w_{n2})^T]^T \tag{22}$$

where $[.]^T$ denotes the transpose operation. From the foregoing, the size of $H_{i,j}$ is therefore $(Kn_2) \times M = (Mn_1) \times M$, and each channel $H_{i,j}$ may be represented as follows:

$$H_{i,j} = [F_{i,j}(t_1)^T | \ldots | F_{i,j}(t_{n1})^T]^T, \tag{23}$$

in which $\{F_{i,j}(t_k)\}_{k=1}^{n1}$ are all square M×M matrices that are invertible with probability almost equal to one in a multipath rich frequency selective channel with tone separations larger than the coherence channel bandwidth.

With this transformation, the transmitted and received signals and noise vectors in the subcarriers $w_1, \ldots, w_{n2}$ can be transformed to:

$$x_i \triangleq [x_i(w_1)^T | \ldots | x_i(w_{n2})^T]^T = [q_i(t_1)^T | \ldots | q_i(t_{n1})^T]^T \tag{24}$$

$$y_j \triangleq [y_j(w_1)^T | \ldots | y_j(w_{n2})^T]^T = [z_j(t_1)^T | \ldots | z_j(t_{n1})^T]^T \tag{25}$$

$$n_j \triangleq [n_j(w_1)^T | \ldots | n_j(w_{n2})^T]^T = [w_j(t_1)^T | \ldots | w_j(t_{n1})^T]^T \tag{26}$$

To conclude step 408, each UE computes the channel matrix $F_{i,j}(t_k)$, i=1, 2 from Equation (23).

At step 410, each UE computes the equivalent channel vector $f_{i,j}^{l,eq}(t_k)$ for each $t_k$, k=1, ..., $n_1$ based on the channel matrix $F_{i,j}(t_k)$ for each data stream l=1, ..., $d_j$ assigned/requested for UE. In some instances, each UE computes the equivalent channel vector $f_{i,j}^{l,eq}(t_k)$ by first computing or deriving a combining vectors $r_{i,j}^{l}(t_k) = (v_{ref}^{l})^H F_{3-i,j}^{-1}(t_k)$, such as by multiplying the Hermitian of the shared predetermined reference vector $v_{ref}^{l}$ and the inverse of the channel $F_{3-i,j}^{-1}(t_k)$. By multiplying the combining vectors $r_{i,j}^{l}(t_k)$ and the channel matrix $F_{i,j}(t_k)$, each UE then computes the equivalent channel matrix $f_{i,j}^{l,eq}(t_k) \triangleq (v_{ref}^{l})^H F_{3-i,j}^{-1}(t_k) F_{i,j}(t_k)$. The equivalent channel vector computation module 116 shown in FIG. 2 may be used to compute the equivalent channel matrix $f_{i,j}^{l,eq}(t_k)$.

At this point, the equivalent channel matrix $f_{i,j}^{l,eq}(t_k)$ may be fed back to the access devices $TX_i$ along with any channel quality indicator (CQI), either directly or indirectly using codebook or non-codebook techniques. The feedback module 118 shown in FIG. 2 may be used to feedback the equivalent channel matrix and CQI information. In addition or in the alternative, each of the transmitters $TX_1$ and $TX_2$ may acquire the equivalent channel matrix $f_{i,j}^{l,eq}(t_k)$ using uplink channel estimation techniques.

At step 412, each transmitter acquires $\{f_{i,j}^{l,eq}(t_k)\}_{k=1}^{n1}$ and $\{CQI_{i,j}^{l}(t_k)\}_{k=1}^{n1}$ values (possibly via the feedback information by UEs) from the UEs, and uses this information to compute the equivalent channel aggregate matrix $F_{i,j}^{eq}(t_k)$ as:

$$F_{i,j}^{eq}(t_k) \triangleq [f_{i,j}^{1,eq}(t_k)^T \ldots f_{i,j}^{d_j,eq}(t_k)^T]^T, \tag{27}$$

in which $f_{i,j}^{l,eq}(t_k) \triangleq (v_{ref}^{l})^H F_{3-i,j}^{-1}(t_k) F_{i,j}^{d_j,eq}(t_k)$. In addition, each transmitter $TX_u$ computes the matrix $P_i(t_k)$ as:

$$P_i(t_k) = \begin{bmatrix} F_{i,1}^{eq}(t_k) \\ \vdots \\ F_{i,L_i}^{eq}(t_k) \\ v_{ref}^{1T} \\ \vdots \\ v_{ref}^{d_{max}^{3-i}T} \end{bmatrix}. \tag{28}$$

At step 412, each transmitter constructs transmit signals $\{q_i(t_k)\}_{k=1}^{n1}$ for the selected $L_i$ UE devices. In selected implementations, the precoding module 216 shown in FIG. 2 may be used to the construct transmit signals $q_i(t_k)$ using a zero-forcing precoding matrix $V_i(t_k)$ as follows:

$$q_i(t_k) = V_i(t_k) s_i(t_k) \tag{29}$$

where $V_i(t_k)$ is the first D columns of $P_i^+(t_k) = P_i^H(t_k)$ $(P_i(t_k) P_i^H(t_k))^{-1}$, $s_i(t_k) = [s_1(t_k) \ldots s_L(t_k)]$ is the data vector to be transmitted to the UEs, and $s^j(t_k)$ is a vector of size $d_j \times 1$ representing a rank-$d_j$ signal that should be transmitted to UE j.

At each transmitter TX, the data to be transmitted to the UEs over the subcarriers $w_1, \ldots, w_{n2}$ is split into n1 rank-$d_j$ data $\{s_{i,j}(t_k)\}_{k=1}^{n1}$. After computing $\{q_i(t_k)\}_{k=1}^{n1}$, the transmitted signals $x_i$, i=1, 2 over subcarriers $w_1 \ldots, w_{n2}$ $\{x_1(w_n)\}_{n=1}^{n2}$ can be computed from Equation (24). The precoding matrix $V_i(t_k)$ can be written as $$V_i(t_k) = [v_{i,1}(t_k) \ldots v_{i,L_i}(t_k)], \tag{30}$$

where $v_{i,j}(t_k)$ is the precoding matrix of size M×$d_j^i$ for the $j^{th}$ selected user and we denote the $l^{th}$ column (l=1, ..., $d_j^i$) of this matrix by $v_{i,j}^{l}(t_k)$. The transmit module 218 shown in FIG. 2 may be used to the transmit signals $q_i(t_k)$.

As a result, the received signal $\tilde{z}_{i,j}^{l}(t_k)$ appears at the $j^{th}$ UE as:

$$\tilde{z}_{j,1}^{l}(t_k) = (v_{ref}^{l})^H F_{2,j}^{-1}(t_k) z_j(t_k) = f_{1,j}^{l,eq}(t_k) q_1(t_k) + (v_{ref}^{l})^H q_2 (t_k) + w_{j,1}^{l,eq}(t_k), j=1, \ldots, L, l=1, \ldots, d_j^1, \ k=1, \ldots, n1, \tag{31}$$

$$\tilde{z}_{j,2}^{l}(t_k) = (v_{ref}^{l})^H F_{1,j}^{-1}(t_k) z_j(t_k) = (V_{ref}^{l})^H q_1(t_k) + f_{2,j}^{l,eq}(t_k) q_2(t_k) + w_{j,2}^{l,eq}(t_k), j=1, \ldots, L, l=1, \ldots, d_j^2, \ k=1, \ldots, n1, \tag{32}$$

where $f_{1,j}^{l,eq}(t_k) \triangleq (v_{ref}^{l})^H F_{2,j}^{-1}(t_k) F_{1,j}(t_k)$, where $f_{2,j}^{l,eq}(t_k) \triangleq (v_{ref}^{l})^H F_{1,j}^{-1}(t_k) F_{2,j}(t_k)$, where $w_{j,1}^{l,eq}(t_k) \triangleq (v_{ref}^{l})^H F_{2,j}^{-1}(t_k) w_j(t_k)$, and where $w_{j,2}^{l,eq}(t_k) \triangleq (v_{ref}^{l})^H F_{1,j}^{-1}(t_k) w_j(t_k)$. $\triangleq$ At step 414, the UE decodes the received data signal, such as by using the decode module 120 shown in FIG. 2. In selected implementations, each UE(i,j) may know its own precoding vectors for its data streams $\{v_{i,j}^{l}(t_k)\}_{k=1}^{n1}$ i=1, ..., $d_j^i$, and uses the precoding vectors to decode its $l^{th}$ data stream $\{s_{i,j}^{l}(t_k)\}_{k=1}^{n1}$ sent from the ith transmitter from $\{\tilde{z}_{j,i}^{l}(t_k)\}_{k=1}^{n1}$. For example, using the known precoding vectors to guarantee that inter-cell and intra-cell interference are cancelled for all $t_k$, k=1, ..., $n_1$, the $j^{th}$ UE (j=1, ..., L) can decode its $l^{th}$ data stream from the $i^{th}$ transmitter (i=1, 2) by single-user detection algorithms using $$\tilde{z}_{i,i}^{l}(t_k) = f_{i,j}^{l,eq}(t_k) v_{i,j}^{l}(t_k) s_{i,j}^{l}(t_k) + w_{j,i}^{l,eq}(t_k), \tag{33}$$

where $s_{i,j}^{l}(t_k)$ denotes the $t_k$-th portion of the $l^{th}$ data stream sent to the $j^{th}$ selected UE from the $i^{th}$ transmitter. At step 416, the process ends.

Using the frequency extension approach, $Dn_1$ data streams are transmitted in total over $n_2$ subcarriers. As a result, the normalized total number of data streams per subcarrier becomes $$\frac{Dn_1}{n_2}.$$

Since the sum of data streams provided to the users is less than or equal to the difference between the number of transmit antennas and the the reserved data ranks for interference (i.e., $D \leq M - d_{max}$), the maximum total number of data streams per subcarrier becomes $$\frac{(M-d_{max})n_1}{n_2} = \frac{(M-d_{max})K}{M}.$$

While the description provided with reference to Equations (17)-(33) explains how the channels $H_{i,j}$ as well as the corresponding transmit and receive signals of UEs are extended in the frequency domain, it will be appreciated that a similar approach would be used to extend the channels $H_{i,j}$ in the time domain. In either case of time or frequency extension, it will be appreciated that there is implied a loss in the spectral efficiency by the ratio of $$\frac{Dn_1}{n_2}$$

for $TX_i$ compared to the M=K case due to the fact that n1 independent signals are transmitted over n2 subcarriers. As a consequence, the extension scheme may not be suitable for small values of $$\frac{Dn_1}{n_2}.$$

In addition, it will be appreciated that the frequency extension approach has more potential for practical use since the time extension approach implies decoding delay which is not acceptable for many applications.

Figure 5:
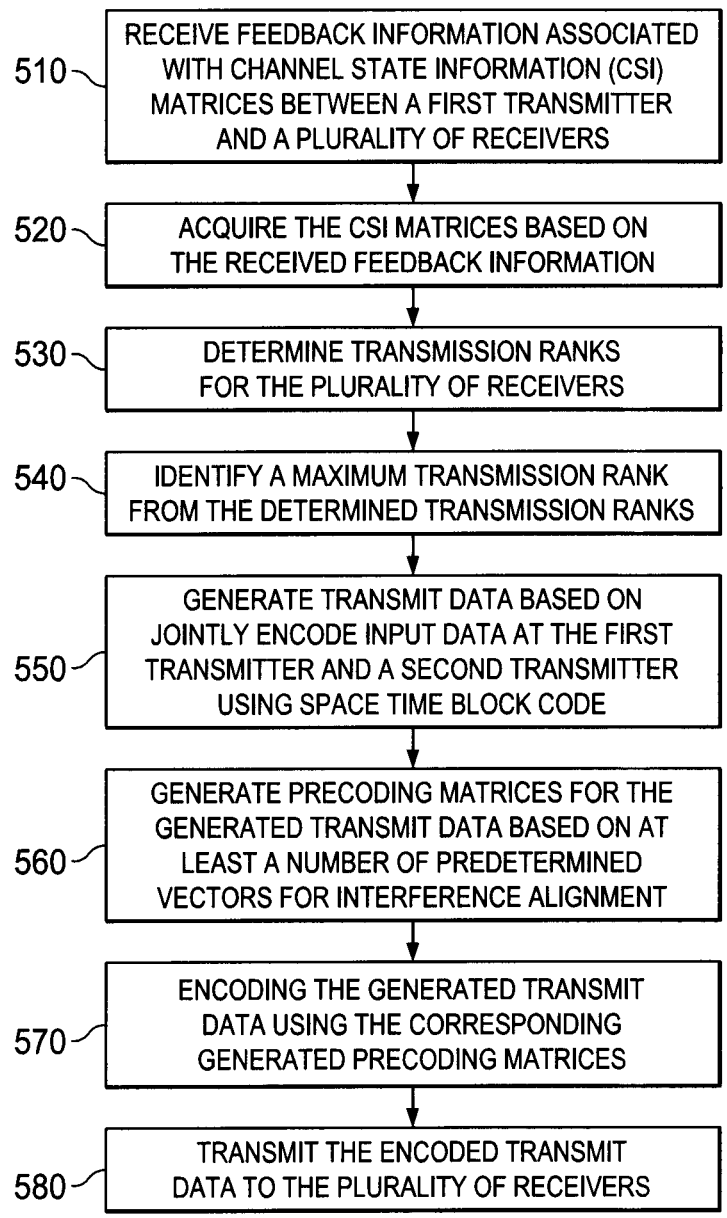
FIG. 5 is a flow chart illustrating an example process of joint transmission using interference alignment at a transmitter.

FIG. 5 is a flow chart illustrating an example process 500 of joint transmission using interference alignment at a transmitter. In the illustrated example 500, a first transmitter and a second transmitter each having K antennas may use interference alignment to encode the same data symbols to be transmitted from both the first transmitter and the second transmitter to each of a plurality of receivers, each having M antennas. In some implementations, the example process 500 may be applied to a joint UE soft handover process, where L UEs each having K antennas are in a soft handover phase, and are handed over between a first base station and a second base station each having M antennas.

At step 510, the first transmitter and the second transmitter may receive feedback information associated with CSI matrices between the first transmitter and the plurality of receivers. Each element of the CSI matrices may be associated with a channel impulse response of the channel between one transmitter antenna and one receiver antenna. The feedback information may be received from each of the plurality of receivers communicably coupled to the corresponding transmitter. At step 520, each transmitter may acquire the CSI matrices based on the received feedback information. For example, the acquired CSI matrices may be the matrices $H_{i,j}$, i=1, ..., M; j=1, ..., K as described in the illustration of FIG. 1.

At step 530, at least one of the first transmitter, or the second transmitter determines transmission ranks for each of the plurality of receivers. At step 540, at least one of the first transmitter, or the second transmitter identifies a maximum transmission rank from the determined transmission ranks. As described in the illustration of FIG. 1, the transmitter may select the UEs and their corresponding rank $d_j$ such that, for each transmitter $TX_i$, its number of antennas (M) is no less than the sum of the total number of transmission ranks D and the identified maximum rank $d_{max}$ ($d_{max}$=max $d_j$) of all the transmission ranks, i.e. $M \geq D + d_{max}$. In some instances, the transmission rank for each receiver may be based on RI reported back from the corresponding receiver.

At step 550, the first transmitter and the second transmitter may generate transmit data based on jointly encode the input data using STBC. For example, the input data may be the data symbols s, the signal to be transmitted from the $i^{th}$ transmitter to the $j^{th}$ receiver may be $s_{ij}$ (in equations (14) and (15)), and the process of generating the data may be substantially similar to the process described in the illustration of FIG. 1. At 560, the first transmitter and the second transmitter each generate a precoding matrix for the generated transmit data. For example, the precoding matrix may be $V_i = [v_{i,1} \ldots v_{i,L}]$ for the $i_{th}$ transmitter, where $V_i$ is the first D columns of the matrix $P_i^+ = P_i^H (P_i P_i^H)^{-1}$, where $v_{i,j}$ is the precoding matrix of size $M \times d_j$ for the $j^{th}$ user, as described in the illustration of FIG. 1. The first transmitter and second transmitter can encode the plurality of signals using their corresponding precoding matrices (e.g., $V_i$) to encode the generated transmit data at step 570 and transmit the encoded transmit data to the plurality of receivers at step 580.

Figure 6:
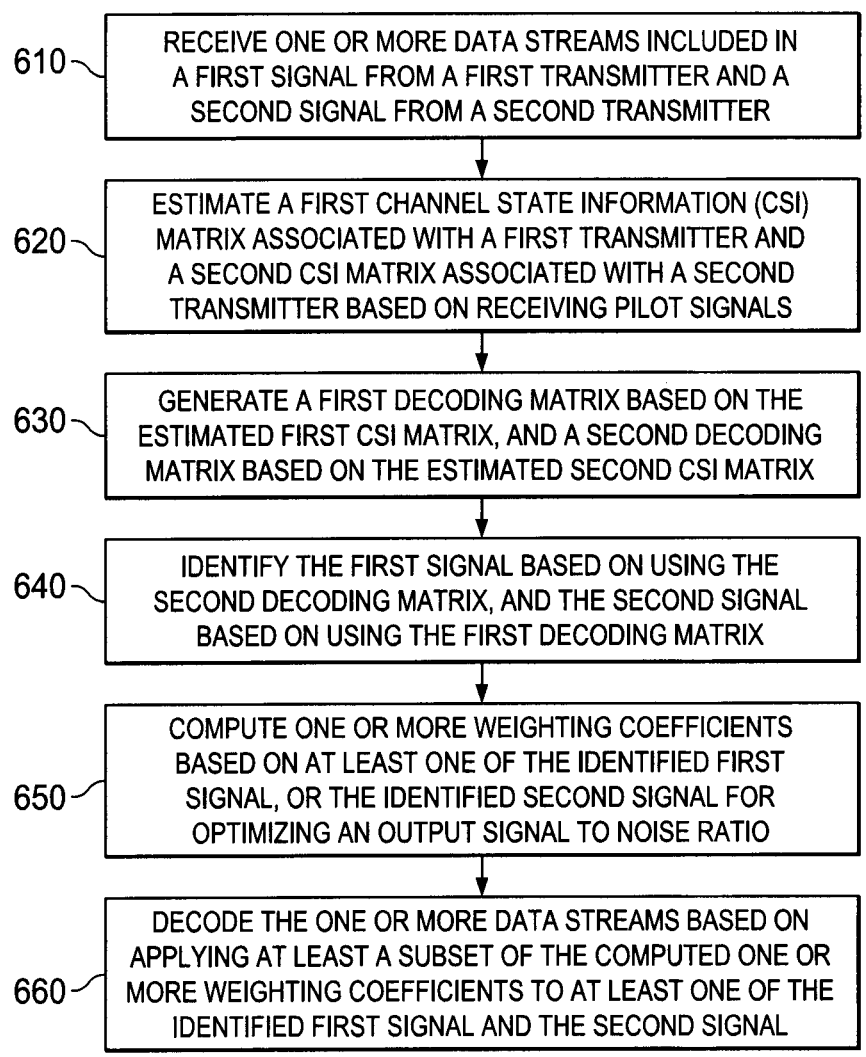
FIG. 6 is a flow chart illustrating an example process of joint transmission using interference alignment at a receiver.

FIG. 6 is a flow chart illustrating an example process 600 of joint transmission using interference alignment at a receiver. In the illustrated example 600, a receiver in a plurality of receivers, each having K antennas, may decode one or more data streams included in both a first signal jointly transmitted using interference alignment from, respectively, a first transmitter and a second transmitter each having M antennas. In some implementations, the example process 600 may be applied to a joint UE soft handover process, where L UEs each having K antennas are in a soft handover phase, and handed over between a first base station and a second base station each having M antennas.

At 610, the receiver receives one or more data streams included in the first signal and the second signal from the first transmitter and the second transmitter. The number of the one or more data streams may be based on the transmission rank $d_j$ determined based on the technology described in the illustration of FIG. 1. At 620, the receiver may estimate a CSI matrix associated with a channel between the first transmitter and the receiver, and a CSI matrix associated with a channel between the second transmitter and the receiver. The estimation may be based on receiving pilot signals (known in advance by the transmitters and the receivers) from both the first transmitter and the second transmitter.

At 630, the receiver may generate a first decoding matrix based on the estimated first CSI matrix and a second decoding matrix based on the estimated second CSI matrix. For example, generating the first decoding matrix and second decoding matrix may be based on computing the combining vectors $r_{i,j}^l$ associated the $l^{th}$ data stream of the signal from the $i^{th}$ transmitter to the $j^{th}$ receiver as described in the illustration of FIG. 1. The decoding matrix may be obtained based on combining the corresponding combining vectors. At 640, the UE identifies the first signal based on using the second decoding matrix, and identify the second signal based on using the first decoding matrix. Using the example illustrated in FIG. 1 for example, the first signal and the second signal may be $x_1$ and $x_2$, respectively. The $y_j$ signal received at $UE_j$ can be processed by separately applying a first combining vector $(r_{1,j}^l = (v_{ref}^l)^H H_{2,j}^+)$ for l=1, ..., $d_j$) and a second combining vector $(r_{2,j}^l = (v_{ref}^l)^H H_{1,j}^+$ for l=1, ..., $d_j$), to derive, $\tilde{y}_{j,1}^l = h_{1,j}^{l,eq} x_1 + n_{j,1}^{l,eq}$, and $\tilde{y}_{j,2}^l = h_{2,j}^{l,eq} x_2 + n_{j,2}^{l,eq}$, j=1, ..., L as shown in equations (5) and (6). Note that $x_1$ is not included in $\tilde{y}_{j,2}^l$ and $x_2$ is not included in $\tilde{y}_{j,2}^l$, as such, the first signal and the second signal are identified.

At 650, the receiver can compute one or more weighting coefficients based on at least one of the identified first signal, or the identified second signal for optimizing an output SNR ratio. The weighting coefficients may be one or more weighting coefficients used for diversity combing in order to reduce decoding error, such as the MRC and optimum combining described in the illustration of FIG. 1. For example, the weighting coefficients for MRC and optimum combining may be the weighting coefficients given in equations (11) and (12), respectively, and are derived based on substantial similar technologies as described in the illustration of FIG. 1. At 660, the receiver decodes the one or more data streams based on applying at least a subset of the computed one or more weighting coefficients to at least one of the identified first signal and the second signal. Again, using the example described in the illustration of FIG. 1 for example, after applying the weighting coefficients to obtain output $z_j^l$ associated with the $l^{th}$, l=1, ..., $d_j$ data stream at the $j^{th}$ receiver, as expressed in equations (11) and (12) for MRC and optimum combining, respectively, the receiver can then decode the $l^{th}$ data stream.

Figure 7:
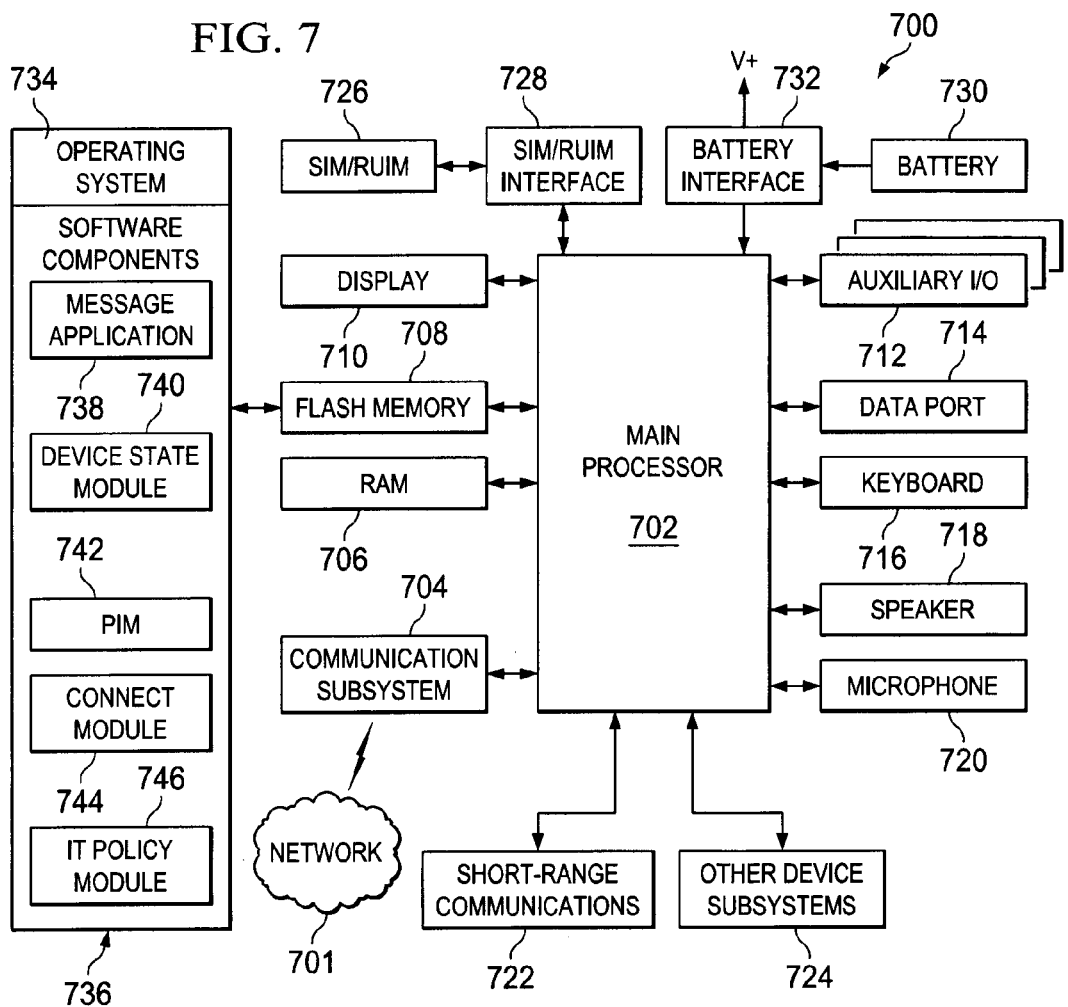
FIG. 7 is a block diagram of an example user equipment communicably coupled to a network.

FIG. 7 is a block diagram of an example UE 700 communicably coupled to a network. The UE 700 is shown with specific components for implementing features described above. It is to be understood that the UE 700 is shown with specific details for exemplary purposes only. As depicted, UE 700 includes a number of components such as a main processor 702 that controls the overall operation of UE 700. Communication functions, including data and voice communications, are performed through a communication subsystem 704. The communication subsystem 104 receives messages from and sends messages to a wireless network 701. In this illustrative implementation of UE 700, communication subsystem 704 is configured in accordance with the Global System for Mobile Communication (GSM) and General Packet Radio Services (GPRS) standards. The GSM/GPRS wireless network is used worldwide and these standards may be superseded eventually by Enhanced Data GSM Environment (EDGE) and Universal Mobile Telecommunications Service (UMTS). New standards are still being defined, but it is believed that they will have similarities to the network behavior described herein, and it will also be understood by persons skilled in the art that the implementations described herein are intended to use any other suitable standards that are developed in the future. The wireless link connecting the communication subsystem 704 with the wireless network 701 represents one or more different Radio Frequency (RF) channels, operating according to defined protocols specified for GSM/GPRS communications. With newer network protocols, these channels are capable of supporting both circuit switched voice communications and packet switched data communications.

Although the wireless network 701 associated with UE 700 is a GSM/GPRS wireless network in one implementation, other wireless networks may also be associated with UE 700 in variant implementations. The different types of wireless networks that may be employed include, for example, data-centric wireless networks, voice-centric wireless networks, and dual-mode networks that can support both voice and data communications over the same physical base stations. Combined dual-mode networks include, but are not limited to, Code Division Multiple Access (CDMA) or CDMA2000 networks, GSM/GPRS networks (as mentioned above), and future generation networks like EDGE, UMTS, WiMAX, LTE and LTE-A. Some other examples of data-centric networks include WiFi 802.11, Mobitex™ and DataTAC™ network communication systems. Examples of other voice-centric data networks include Personal Communication Systems (PCS) networks like GSM and Time Division Multiple Access (TDMA) systems.

The main processor 702 also interacts with additional subsystems such as a Random Access Memory (RAM) 706, a flash memory 708, a display 710, an auxiliary input/output (I/O) subsystem 712, a data port 714, a keyboard 716, a speaker 718, a microphone 720, short-range communications 722, and other device subsystems 724.

Some of the subsystems of the UE 700 perform communication-related functions, whereas other subsystems may provide "resident" or on-device functions. By way of example, the display 710 and the keyboard 716 may be used for both communication-related functions, such as entering a text message for transmission over the network 701, and device-resident functions such as a calculator or task list.

The UE 700 can send and receive communication signals over the wireless network 701 after required network registration or activation procedures have been completed. Network access is associated with a subscriber or user of the UE 700. To identify a subscriber, the UE 700 requires a SIM/RUIM card 726 (i.e. Subscriber Identity Module or a Removable User Identity Module) to be inserted into a SIM/RUIM interface 728 in order to communicate with a network. The SIM/RUIM card 726 is one type of a conventional "smart card" that can be used to identify a subscriber of the UE 700 and to personalize the UE 700, among other things. Without the SIM/RUIM card 726, the UE 700 is not fully operational for communication with the wireless network 701. By inserting the SIM/RUIM card 726 into the SIM/RUIM interface 728, a subscriber can access all subscribed services. Services may include: web browsing and messaging such as e-mail, voice mail, Short Message Service (SMS), and Multimedia Messaging Services (MMS). More advanced services may include: point of sale, field service and sales force automation. The SIM/RUIM card 726 includes a processor and memory for storing information. Once the SIM/RUIM card 726 is inserted into the SIM/RUIM interface 728, it is coupled to the main processor 702. In order to identify the subscriber, the SIM/RUIM card 726 can include some user parameters such as an International Mobile Subscriber Identity (IMSI). An advantage of using the SIM/RUIM card 726 is that a subscriber is not necessarily bound by any single physical UE. The SIM/RUIM card 726 may store additional subscriber information for UE as well, including datebook (or calendar) information and recent call information. Alternatively, user identification information can also be programmed into the flash memory 708.

The UE 700 is a battery-powered device and includes a battery interface 732 for receiving one or more rechargeable batteries 730. In at least some implementations, the battery 730 can be a smart battery with an embedded microprocessor. The battery interface 732 is coupled to a regulator (not shown), which assists the battery 730 in providing power V+ to the UE 700. Although current technology makes use of a battery, future technologies such as micro fuel cells may provide the power to the UE 700.

The UE 700 also includes an operating system 734 and software components 736 which are described in more detail below. The operating system 734 and the software components 736 that are executed by the main processor 702 are typically stored in a persistent store such as the flash memory 708, which may alternatively be a read-only memory (ROM) or similar storage element (not shown). Those skilled in the art will appreciate that portions of the operating system 734 and the software components 736 such as specific device applications, or parts thereof, may be temporarily loaded into a volatile store such as the RAM 706. Other software components can also be included, as is well known to those skilled in the art.

The subset of software components 736 that control basic device operations, including data and voice communication applications, will normally be installed on the UE 700 during its manufacture. Other software applications include a message application 738 that can be any suitable software program that allows a user of the UE 700 to send and receive electronic messages. Various alternatives exist for the message application 738 as is well known to those skilled in the art. Messages that have been sent or received by the user are typically stored in the random access or flash memory 708 of the UE 700 or some other suitable storage element in the UE 700. In at least some implementations, some of the sent and received messages may be stored remotely from the device 700 such as in a data store of an associated host system that the UE 700 communicates with.

The software applications can further include a device state module 740, a Personal Information Manager (PIM) 742, and other suitable modules (not shown). The device state module 740 provides persistence, i.e. the device state module 740 ensures that important device data is stored in persistent memory, such as the flash memory 708, so that the data is not lost when the UE 700 is turned off or loses power.

The PIM 742 includes functionality for organizing and managing data items of interest to the user, such as, but not limited to, e-mail, contacts, calendar events, voice mails, appointments, and task items. A PIM application has the ability to send and receive data items via the wireless network 701. PIM data items may be seamlessly integrated, synchronized, and updated via the wireless network 701 with the UE subscriber's corresponding data items stored or associated with a host computer system. This functionality creates a mirrored host computer on the UE 700 with respect to such items. This can be particularly advantageous when the host computer system is the UE subscriber's office computer system.

The UE 700 also includes a connect module 744, and an IT policy module 746. The connect module 744 implements the communication protocols that are required for the UE 700 to communicate with the wireless infrastructure and any host system, such as an enterprise system, that the UE 700 is authorized to interface with. Examples of a wireless infrastructure and an enterprise system are given in FIG. 10 described in more detail below.

The connect module 744 includes a set of APIs that can be integrated with the UE 700 to allow the UE 700 to use any number of services associated with the enterprise system. The connect module 744 allows the UE 700 to establish an end-to-end secure, authenticated communication pipe with the host system. A subset of applications for which access is provided by the connect module 744 can be used to pass IT policy commands from the host system to the UE 700. This can be done in a wireless or wired manner. These instructions can then be passed to the IT policy module 746 to modify the configuration of the device 700. Alternatively, in some cases, the IT policy update can also be done over a wired connection.

The IT policy module 746 receives IT policy data that encodes the IT policy. The IT policy module 746 then ensures that the IT policy data is authenticated by the UE 700. The IT policy data can then be stored in the flash memory 708 in its native form. After the IT policy data is stored, a global notification can be sent by the IT policy module 746 to all of the applications residing on the UE 700. Applications for which the IT policy may be applicable then respond by reading the IT policy data to look for IT policy rules that are applicable.

The IT policy module 746 can include a parser (not shown), which can be used by the applications to read the IT policy rules. In some cases, another module or application can provide the parser. Grouped IT policy rules, described in more detail below, are retrieved as byte streams, which are then sent (recursively, in a sense) into the parser to determine the values of each IT policy rule defined within the grouped IT policy rule. In at least some implementations, the IT policy module 746 can determine which applications are affected by the IT policy data and send a notification to only those applications. In either of these cases, for applications that are not running at the time of the notification, the applications can call the parser or the IT policy module 746 when they are executed to determine if there are any relevant IT policy rules in the newly received IT policy data.

All applications that support rules in the IT Policy are coded to know the type of data to expect. For example, the value that is set for the "WEP User Name" IT policy rule is known to be a string; therefore, the value in the IT policy data that corresponds to this rule is interpreted as a string. As another example, the setting for the "Set Maximum Password Attempts" IT policy rule is known to be an integer, and therefore the value in the IT policy data that corresponds to this rule is interpreted as such.

After the IT policy rules have been applied to the applicable applications or configuration files, the IT policy module 746 sends an acknowledgement back to the host system to indicate that the IT policy data was received and successfully applied.

Other types of software applications can also be installed on the UE 700. These software applications can be third party applications, which are added after the manufacture of the UE 700. Examples of third party applications include games, calculators, utilities, etc.

The additional applications can be loaded onto the UE 700 through at least one of the wireless network 701, the auxiliary I/O subsystem 712, the data port 714, the short-range communications subsystem 722, or any other suitable device subsystem 724. This flexibility in application installation increases the functionality of the UE 700 and may provide enhanced on-device functions, communication-related functions, or both. For example, secure communication applications may enable electronic commerce functions and other such financial transactions to be performed using the UE 700.

The data port 714 enables a subscriber to set preferences through an external device or software application and extends the capabilities of the UE 700 by providing for information or software downloads to the UE 700 other than through a wireless communication network. The alternate download path may, for example, be used to load an encryption key onto the UE 700 through a direct, and thus reliable and trusted connection, to provide secure device communication.

The data port 714 can be any suitable port that enables data communication between the UE 700 and another computing device. The data port 714 can be a serial or a parallel port. In some instances, the data port 714 can be a USB port that includes data lines for data transfer and a supply line that can provide a charging current to charge the battery 730 of the UE 700.

The short-range communications subsystem 722 provides for communication between the UE 700 and different systems or devices, without the use of the wireless network 701. For example, the subsystem 722 may include an infrared device and associated circuits and components for short-range communication. Examples of short-range communication standards include standards developed by the Infrared Data Association (IrDA), Bluetooth, and the 802.11 family of standards developed by IEEE.

In use, a received signal such as a text message, an e-mail message, or web page download will be processed by the communication subsystem 704 and input to the main processor 702. The main processor 702 will then process the received signal for output to the display 710 or alternatively to the auxiliary I/O subsystem 712. A subscriber may also compose data items, such as e-mail messages, for example, using the keyboard 716 in conjunction with the display 710 and possibly the auxiliary I/O subsystem 712. The auxiliary subsystem 712 may include devices such as: a touch screen, mouse, track ball, infrared fingerprint detector, or a roller wheel with dynamic button pressing capability. The keyboard 716 is preferably an alphanumeric keyboard or telephone-type keypad. However, other types of keyboards may also be used. A composed item may be transmitted over the wireless network 200 through the communication subsystem 704.

For voice communications, the overall operation of the UE 700 is substantially similar, except that the received signals are output to the speaker 718, and signals for transmission are generated by the microphone 720. Alternative voice or audio I/O subsystems, such as a voice message recording subsystem, can also be implemented on the UE 700. Although voice or audio signal output is accomplished primarily through the speaker 718, the display 710 can also be used to provide additional information such as the identity of a calling party, duration of a voice call, or other voice call related information.

Figure 8:
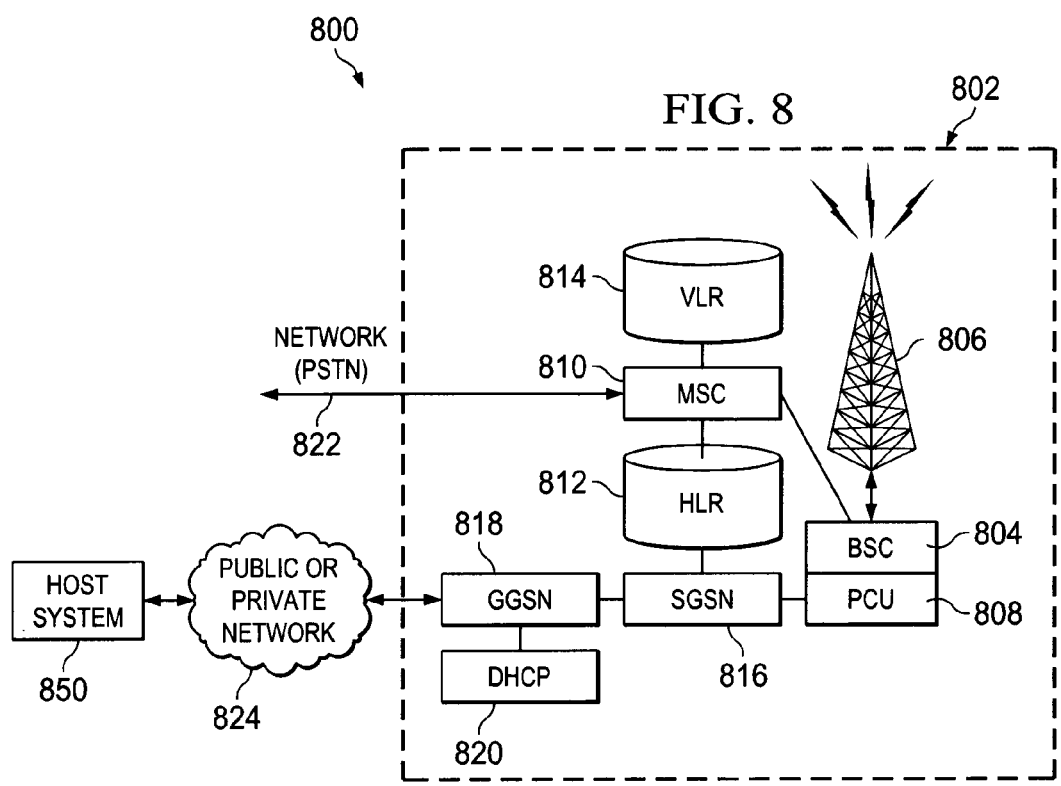
FIG. 8 is a block diagram of an example subsystem of a wireless network.

FIG. 8 is a block diagram of an example subsystem 800 of the wireless network 701. In practice, the wireless network 701 described in the illustration of FIG. 7 comprises one or more subsystems 802. In conjunction with the connect module 744, the UE 700 can communicate with the subsystem 802 within the wireless network 701. In the illustrative implementation 800, the subsystem 802 is configured in accordance with General Packet Radio Service (GPRS) and Global Systems for Mobile (GSM) technologies. However, in other implementations, subsystem 802 may be configured in accordance with Long Term Evolution (LTE) technology, LTE-Advanced, or IEEE WiMAX. The subsystem 802 includes a base station controller (BSC) 804 with an associated tower station 806, a Packet Control Unit (PCU) 808 added for GPRS support in GSM, a Mobile Switching Center (MSC) 810, a Home Location Register (HLR) 812, a Visitor Location Registry (VLR) 814, a Serving GPRS Support Node (SGSN) 816, a Gateway GPRS Support Node (GGSN) 818, and a Dynamic Host Configuration Protocol (DHCP) 820. This list of components is not meant to be an exhaustive list of the components of every subsystem 802 within a GSM/GPRS network, but rather a list of components that are commonly used in communications through the network 701.

In a GSM network, the MSC 810 is coupled to the BSC 804 and to a landline network, such as a Public Switched Telephone Network (PSTN) 822 to satisfy circuit switched requirements. The connection through the PCU 808, the SGSN 816 and the GGSN 818 to a public or private network (Internet) 824 (also referred to herein generally as a shared network infrastructure) represents the data path for GPRS capable UEs. In a GSM network extended with GPRS capabilities, the BSC 804 also contains the Packet Control Unit (PCU) 808 that connects to the SGSN 816 to control segmentation, radio channel allocation and to satisfy packet switched requirements. To track the location of the UE 700 and availability for both circuit switched and packet switched management, the HLR 812 is shared between the MSC 810 and the SGSN 816. Access to the VLR 814 is controlled by the MSC 810.

The station 806 is a fixed transceiver station and together with the BSC 804 form fixed transceiver equipment. The fixed transceiver equipment provides wireless network coverage for a particular coverage area commonly referred to as a "cell". The fixed transceiver equipment transmits communication signals to, and receives communication signals from, UEs within its cell via the station 806. The fixed transceiver equipment normally performs such functions as modulation and possibly encoding or encryption of signals to be transmitted to the UE 700 in accordance with particular, usually predetermined, communication protocols and parameters, under control of its controller. The fixed transceiver equipment similarly demodulates and possibly decodes and decrypts, if necessary, any communication signals received from the UE 700 within its cell. Communication protocols and parameters may vary between different nodes. For example, one node may employ a different modulation scheme and operate at different frequencies than other nodes.

For all user equipment 700 registered with a specific network, permanent configuration data such as a user profile is stored in the HLR 812. The HLR 812 also contains location information for each registered user equipment, and can be queried to determine the current location of a UE device. The MSC 810 is responsible for a group of location areas and stores the data of the UE devices currently in its area of responsibility in the VLR 814. Further, the VLR 814 also contains information on UE devices that are visiting other networks. The information in the VLR 814 includes part of the permanent UE data transmitted from the HLR 812 to the VLR 814 for faster access. By moving additional information from a remote HLR 812 node to the VLR 814, the amount of traffic between these nodes can be reduced so that voice and data services can be provided with faster response times and at the same time requiring less use of computing resources.

The SGSN 816 and the GGSN 818 are elements added for GPRS support; namely, packet switched data support, within GSM. The SGSN 816 and the MSC 810 have similar responsibilities within the wireless network 701 by keeping track of the location of each UE 700. The SGSN 816 also performs security functions and access control for data traffic on the wireless network 701. The GGSN 818 provides internetworking connections with external packet switched networks and connects to one or more SGSN's 816 via an Internet Protocol (IP) backbone network operated within the network 701. During normal operations, a given UE 700 must perform a "GPRS Attach" to acquire an IP address and to access data services. This requirement is not present in circuit switched voice channels as Integrated Services Digital Network (ISDN) addresses are used for routing incoming and outgoing calls. Currently, all GPRS capable networks use private, dynamically assigned IP addresses, thus requiring the DHCP server 820 connected to the GGSN 818. There are many mechanisms for dynamic IP assignment, including using a combination of a Remote Authentication Dial-In User Service (RADIUS) server and a DHCP server. Once the GPRS Attach is complete, a logical connection is established from a UE 700, through the PCU 808, and the SGSN 816 to an Access Point Node (APN) within the GGSN 818. The APN represents a logical end of an IP tunnel that can either access direct Internet compatible services or private network connections. The APN also represents a security mechanism for the network 701, insofar as each UE 700 must be assigned to one or more APNs and UEs 700 cannot exchange data without first performing a GPRS Attach to an APN that it has been authorized to use. The APN may be considered to be similar to an Internet domain name such as "myconnection.wireless.com".

Once the GPRS Attach operation is complete, a tunnel is created and all traffic is exchanged within standard IP packets using any protocol that can be supported in IP packets. This includes tunneling methods such as IP over IP as in the case with some IPSecurity (IPsec) connections used with Virtual Private Networks (VPN). These tunnels are also referred to as Packet Data Protocol (PDP) Contexts and there are a limited number of these available in the network 701. To maximize use of the PDP Contexts, the network 701 will run an idle timer for each PDP Context to determine if there is a lack of activity. When a UE 700 is not using its PDP Context, the PDP Context can be de-allocated and the IP address returned to the IP address pool managed by the DHCP server 820.

It should be understood that as used herein, terms such as coupled, connected, electrically connected, in signal communication, and the like may include direct connections between components, indirect connections between components, or both, as would be apparent in the overall context of a particular implementation. The term coupled is intended to include, but not be limited to, a direct electrical connection.

It should be understood that all the processes disclosed in this disclosure may include additional, fewer, and/or different operations performed in the order shown or in a different order. Moreover, one or more of the individual operations and/or subsets of the operations in the processes can be performed in isolation and/or in different contexts to achieve a similar or different result. In some implementations, one or more of the operations in the processes may be iterated, repeated, omitted, modified, and/or performed by multiple sub-operations. Some or all aspects of the processes may be implemented by data processing apparatus executing computer-readable instructions, which may be included in one or more software programs, modules, or applications configured to provide the functionality described. While the processes is discussed in terms of determining values of temporal changes in elevation and/or temporal changes in gradient for a time period based on measurements of temporal changes in elevation and/or temporal changes in gradient for the time period, the processes may be used to calculate surface elevations and/or surface gradients for a given time point based on elevation measurements and/or gradient measurements for the given time point.

Numerous modifications and variations of the present application are possible in light of the above teachings. It is therefore to be understood that within the scope of the appended claims, the implementations of the application may be practiced otherwise than as specifically described herein.

Although the described exemplary implementations disclosed herein are described with reference to a new downlink multi-user MIMO interference alignment scheme, the present disclosure is not necessarily limited to the example implementations which illustrate inventive aspects of the present disclosure that are applicable to a wide variety of signaling schemes and applications. Thus, the particular implementations disclosed above are illustrative only and should not be taken as limitations upon the present disclosure, as the disclosure may be modified and practiced in different but equivalent manners apparent to those skilled in the art having the benefit of the teachings herein. Accordingly, the foregoing description is not intended to limit the disclosure to the particular form set forth, but on the contrary, is intended to cover such alternatives, modifications and equivalents as may be included within the spirit and scope of the disclosure as defined by the appended claims so that those skilled in the art should understand that they can make various changes, substitutions and alterations without departing from the spirit and scope of the disclosure in its broadest form.

What is claimed is:

1. A method of encoding for interference management, where a plurality of receivers each having K antennas are communicably coupled to a first transmitter and a second transmitter each having M antennas, the method comprising:
   acquiring a channel state information (CSI) matrix for each of a plurality of multiple-input-multiple output (MIMO) channels between a first transmitter and a plurality of receivers;
   determining transmission ranks for the plurality of receivers, wherein each of the transmission ranks corresponds to a number of one or more data streams to be transmitted from both the first transmitter and a second transmitter to a receiver of the plurality of receivers;
   identifying a maximum transmission rank from the determined transmission ranks;
   wherein a sum of the determined transmission ranks and the identified maximum transmission is less than or equal to M;
   generating transmit data that includes the one or more data streams to be transmitted from both the first transmitter and the second transmitter to each of the corresponding plurality of receivers;
   generating a precoding matrix for the generated transmit data based, at least in part, on the acquired CSI matrix, wherein the precoding matrix generated to increase a transmission rank of the generated transmit data, and to cancel interference associated with the second transmitter at each of the plurality of receivers; and
   encoding the transmit data using the corresponding generated precoding matrix.

2. The method of claim 1, wherein generating the transmit data further includes generating the transmit data based on jointly encoding input data at the first transmitter and the second transmitter using space-time block code.

3. The method of claim 1, wherein acquiring the CSI matrix includes acquiring the CSI matrix based on receiving feedback information associated with the CSI matrix from each of the plurality of receivers.

4. The method of claim 1, wherein generating the precoding matrix further includes generating the precoding matrix based, at least in part, on a number of predetermined vectors, wherein the number of the predetermined vectors equals the identified maximum transmission rank, and wherein cancel interference further includes computing a null space of the number of predetermined vectors, and align the interferences in at least a subspace of the null space.

5. The method of claim 4, wherein the number of predetermined vectors are linearly independent vectors included in an indexed list, known by the first transmitter, the second transmitter, and the plurality of receivers.

6. The method of claim 4, wherein the number of predetermined vectors is less than or equal to a number of orthogonal basis vectors for an M-dimensional transmission space.

7. The method of claim 1, wherein the first transmitter is a first base station, the second transmitter is a second base station, and the plurality of receivers are a plurality of mobile devices that are handed over between the first base station and the second base station.

8. The method of claim 1, further comprising transmitting the encoded transmit data from the first transmitter using at least one of a same time, or frequency resources as the transmit data transmitting from the second transmitter.

9. An apparatus comprising:
M antennas; and
at least one hardware processor operable to execute instructions to:
  acquire a channel state information (CSI) matrix for each of a plurality of multiple-input-multiple output (MIMO) channels between a first transmitter and a plurality of receivers;
  determine transmission ranks for the plurality of receivers, wherein each of the transmission ranks corresponds to a number of one or more data streams to be transmitted from both the first transmitter and a second transmitter to a receiver of the plurality of receivers;
  identify a maximum transmission rank from the determined transmission ranks;
  wherein a sum of the determined transmission ranks and the identified maximum transmission is less than or equal to M;
  generate transmit data that includes the one or more data streams to be transmitted from both the first transmitter and the second transmitter to each of the corresponding plurality of receivers;
  generate a precoding matrix for the generated transmit data based, at least in part, on the acquired CSI matrix, wherein the precoding matrix generated to increase a transmission rank of the generated transmit data, and to cancel interference associated with the second transmitter at each of the plurality of receivers; and
  encode the transmit data using the corresponding generated precoding matrix.

10. The apparatus of claim 9, wherein generating the transmit data further includes generating the transmit data based on jointly encoding input data at the first transmitter and the second transmitter using space-time block code.

11. The apparatus of claim 9, wherein acquiring the CSI matrix includes acquiringthe CSI matrix based on receiving feedback information associated with the CSI matrix from each of the plurality of receivers.

12. The apparatus of claim 9, wherein generating the precoding matrix further includes generating the precoding matrix based, at least in part, on a number of predetermined vectors, wherein the number of the predetermined vectors equals the identified maximum transmission rank, and wherein cancel interference further includes compute a null space of the number of predetermined vectors, and align the interferences in at least a subspace of the null space.

13. The apparatus of claim 12, wherein the number of predetermined vectors are linearly independent vectors included in an indexed list, known by the first transmitter, the second transmitter, and the plurality of receivers.

14. The apparatus of claim 12, wherein the number of predetermined vectors is less than or equal to a number of orthogonal basis vectors for an M-dimensional transmission space.

15. The apparatus of claim 9, wherein the first transmitter is a first base station, the second transmitter is a second base station, and the plurality of receivers are a plurality of mobile devices that are handed over between the first base station and the second base station.

16. The apparatus of claim 9, the at least one hardware process further operable to execute instructions to transmit the encoded transmit data from the first transmitter using at least one of a same time, or frequency resources as the transmit data transmit from the second transmitter.

17. A non-transitory, tangible computer readable storage medium for interference management, where a plurality of receivers each having K antennas are communicably coupled to a first transmitter and a second transmitter each having M antennas, the non-transitory, tangible computer readable storage medium encoded with computer executable instructions, wherein execution of the computer executable instructions is for:
  acquiring a channel state information (CSI) matrix for each of a plurality of multiple-input-multiple output (MIMO) channels between a first transmitter and a plurality of receivers;
  determining transmission ranks for the plurality of receivers, wherein each of the transmission ranks corresponds to a number of one or more data streams to be transmitted from both the first transmitter and a second transmitter to a receiver of the plurality of receivers;
  identifying a maximum transmission rank from the determined transmission ranks;
  wherein a sum of the determined transmission ranks and the identified maximum transmission is less than or equal to M;
  generating transmit data that includes the one or more data streams to be transmitted from both the first transmitter and the second transmitter to each of the corresponding plurality of receivers;
  generating a precoding matrix for the generated transmit data based, at least in part, on the acquired CSI matrix, wherein the precoding matrix generated to increase a transmission rank of the generated transmit data, and to cancel interference associated with the second transmitter at each of the plurality of receivers; and
  encoding the transmit data using the corresponding generated precoding matrix.

18. The non-transitory, tangible computer readable storage medium of claim 17, wherein generating the transmit data further includes generating the transmit data based on jointly encoding input data at the first transmitter and the second transmitter using space-time block code.

19. The non-transitory, tangible computer readable storage medium of claim 17, wherein acquiring the CSI matrix includes acquiring the CSI matrix based on receiving feedback information associated with the CSI matrix from each of the plurality of receivers.

20. The non-transitory, tangible computer readable storage medium of claim 17, wherein generating the precoding matrix further includes generating the precoding matrix based, at least in part, on a number of predetermined vectors, wherein the number of the predetermined vectors equals the identified maximum transmission rank, and wherein cancel interference further includes computing a null space of the number of predetermined vectors, and align the interferences in at least a subspace of the null space.

* * * * *